US010960285B2

(12) United States Patent
Sundararajan et al.

(10) Patent No.: US 10,960,285 B2
(45) Date of Patent: Mar. 30, 2021

(54) SENSOR-DERIVED OBJECT FLIGHT PERFORMANCE TRACKING

(71) Applicant: Intel Corporation, Santa Clara, CA (US)

(72) Inventors: Narayan Sundararajan, Palo Alto, CA (US); Xue Yang, Arcadia, CA (US); Suresh V. Golwalkar, Phoenix, AZ (US); Mahanth Gowda, Urbana, IL (US); Romit Roy Choudhury, Urbana, IL (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/552,968

(22) Filed: Aug. 27, 2019

(65) Prior Publication Data

US 2020/0009439 A1 Jan. 9, 2020

Related U.S. Application Data

(62) Division of application No. 15/470,530, filed on Mar. 27, 2017, now Pat. No. 10,420,999.

(51) Int. Cl.
*G01K 1/02* (2006.01)
*A63B 69/36* (2006.01)
(Continued)

(52) U.S. Cl.
CPC ...... *A63B 69/3658* (2013.01); *A63B 24/0021* (2013.01); *A63B 43/004* (2013.01);
(Continued)

(58) Field of Classification Search
None
See application file for complete search history.

(56) References Cited

U.S. PATENT DOCUMENTS 5,317,689 A 5/1994 Nack et al.
6,148,271 A 11/2000 Marinelli
(Continued)

FOREIGN PATENT DOCUMENTS

CN 204680194 U 9/2015
CN 105105755 A 12/2015

OTHER PUBLICATIONS

U.S. Appl. No. 15/470,530, filed Mar. 27, 2017, Sensor-Derived Object Flight Performance Tracking, U.S. Pat. No. 10,420,999.
(Continued)

*Primary Examiner* — Tung S Lau
(74) *Attorney, Agent, or Firm* — Schwegman Lundberg & Woessner, P.A.

(57) ABSTRACT

Systems and techniques for sensor-derived object flight performance tracking are described herein. A set of magnetometer readings may be obtained from a magnetometer included with an object. A local rotation axis of the object may be determined at a time using the set of magnetometer readings. The local rotation axis may describe rotation of the object around a local magnetic target. A global rotation axis may be calculated based on an initial orientation of the object. The global rotation axis may describe a fixed rotation axis of the object during flight in a global coordinate frame, wherein an angle between the global rotation axis and magnetic north remains constant during the flight. An orientation of the object may be determined for the time using the global rotation axis and the local rotation axis of the object at the time.

21 Claims, 21 Drawing Sheets

(51) Int. Cl.
  *G01P 15/08* (2006.01)
  *A63B 24/00* (2006.01)
  *A63B 69/00* (2006.01)
  *A63B 43/00* (2006.01)
  *G09B 9/00* (2006.01)
  *G09B 19/00* (2006.01)

(52) U.S. Cl.
  CPC ...... *A63B 69/0002* (2013.01); *G01P 15/0885* (2013.01); *G09B 9/00* (2013.01); *G09B 19/0038* (2013.01); *A63B 2024/0028* (2013.01); *A63B 2209/08* (2013.01)

(56) References Cited

U.S. PATENT DOCUMENTS

| | | | |
|---|---|---|---|
| 6,157,342 | A | 12/2000 | Okude et al. |
| 8,647,214 | B2 | 2/2014 | Wiegers et al. |
| 8,783,574 | B2 | 7/2014 | Kumar |
| 8,939,056 | B1 * | 1/2015 | Neal, III ............... B64D 17/80 89/1.51 |
| 9,056,676 | B1 * | 6/2015 | Wang ................ G01C 21/3697 |
| 10,118,696 | B1 * | 11/2018 | Hoffberg ............... B64C 39/001 |
| 10,254,499 | B1 * | 4/2019 | Cohen ..................... B23K 1/19 |
| 10,420,999 | B2 * | 9/2019 | Sundararajan ....... A63B 43/004 |
| 2005/0068228 | A1 | 3/2005 | Burchfiel |
| 2005/0077085 | A1 | 4/2005 | Zeller et al. |
| 2007/0095135 | A1 * | 5/2007 | Rueger .................. G01M 9/06 73/147 |
| 2008/0258572 | A1 | 10/2008 | Koehler |
| 2010/0001952 | A1 * | 1/2010 | Hiratake ............... G06F 3/0346 345/158 |
| 2010/0113153 | A1 * | 5/2010 | Yen ...................... A63F 13/212 463/37 |
| 2011/0307213 | A1 | 12/2011 | Zhao et al. |
| 2014/0222369 | A1 | 8/2014 | Flament et al. |
| 2015/0149104 | A1 | 5/2015 | Baker et al. |
| 2015/0251187 | A1 * | 9/2015 | Harthoorn ............ A01G 23/067 241/101.71 |
| 2016/0334212 | A1 | 11/2016 | Favilla et al. |
| 2018/0272221 | A1 | 9/2018 | Sundararajan et al. |

OTHER PUBLICATIONS

"U.S. Appl. No. 15/470,530, Examiner Interview Summary dated Aug. 31, 2018", 1 pg.

"U.S. Appl. No. 15/470,530, Examiner Interview Summary dated Nov. 30, 2018", 2 pgs.

"U.S. Appl. No. 15/470,530, Final Office Action dated Jan. 30, 2019", 10 pgs.

"U.S. Appl. No. 15/470,530, Non Final Office Action dated May 3, 2018", 19 pgs.

"U.S. Appl. No. 15/470,530, Notice of Allowance dated May 10, 2019", 14 pgs.

"U.S. Appl. No. 15/470,530, Notice of Non-Responsive Amendment dated Aug. 31, 2018".

"U.S. Appl. No. 15/470,530, Response filed Apr. 30, 2019 to Final Office Action dated Jan. 30, 2019", 8 pgs.

"U.S. Appl. No. 15/470,530, Response Filed Aug. 3, 2018 to Non Final Office Action dated May 3, 2018", 15 pgs.

"U.S. Appl. No. 15/470,530, Response filed Nov. 30, 2018 to Notice of Non-Responsive Amendment dated Aug. 31, 2018", 9 pgs.

"Spalding(R) and ShotTracker(R) Partner with Decawave", decaWave, [Online]. Retrieved from the Internet: <URL: https://www.decawave.com/news/currentnews/ spaldingrandshottrackerrpartnerdecawave>, (Accessed on Jun. 21, 2017), 2 pgs.

Adam, C Salamon, "Accurate Tilt Estimation of a Rotating Platform Using Inertial Sensing", (Jun. 2014), 68 pgs.

Elena, Bergamini, "Estimating Orientation Using Magnetic and Inertial Sensors and Different Sensor Fusion Approaches ccuracy Assessment in Manual and Locomotion Tasks", (Oct. 9, 2014), 25 pgs.

Fatemeh, Abyarjoo, "Sensor Fusion for Effective Hand Motion Detection", (Jun. 22, 2015), 184 pgs.

Fuss, Franz Konstantin, et al., "Determination of spin rate and axes with an instrumented cricket ball", SciVerse Science Direct Procedia Engineering 34 ( 2012 ), (2012), 128-133.

Stephen, John Cockcroft, "Novel motion capture methods for sports analysis: case studies of cycling and rugby goal kicking", (Dec 2015), 168 pgs.

* cited by examiner

SENSOR-DERIVED OBJECT FLIGHT PERFORMANCE TRACKING

CROSS-REFERENCE TO RELATED APPLICATION

This application is a divisional of U.S. patent application Ser. No. 15/470,530, filed Mar. 27, 2017, which is incorporated by reference herein in its entirety.

TECHNICAL FIELD

Embodiments described herein generally relate to sports ball flight tracking and, in some embodiments, more specifically to sensor-derived ball flight performance tracking.

BACKGROUND

The flight performance of a ball in a sports context has an impact on a player's performance in a sport. In cricket, a bowler throws a ball to a batsman and the flight characteristics of the ball impact the batsman's strike of the ball. The bowler may wish to understand how the throwing technique impacts the ball flight characteristics of the ball to improve bowling performance. For example, to prevent a batsman from contacting the ball so as to hit the ball beyond the field boundary resulting in scored runs.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
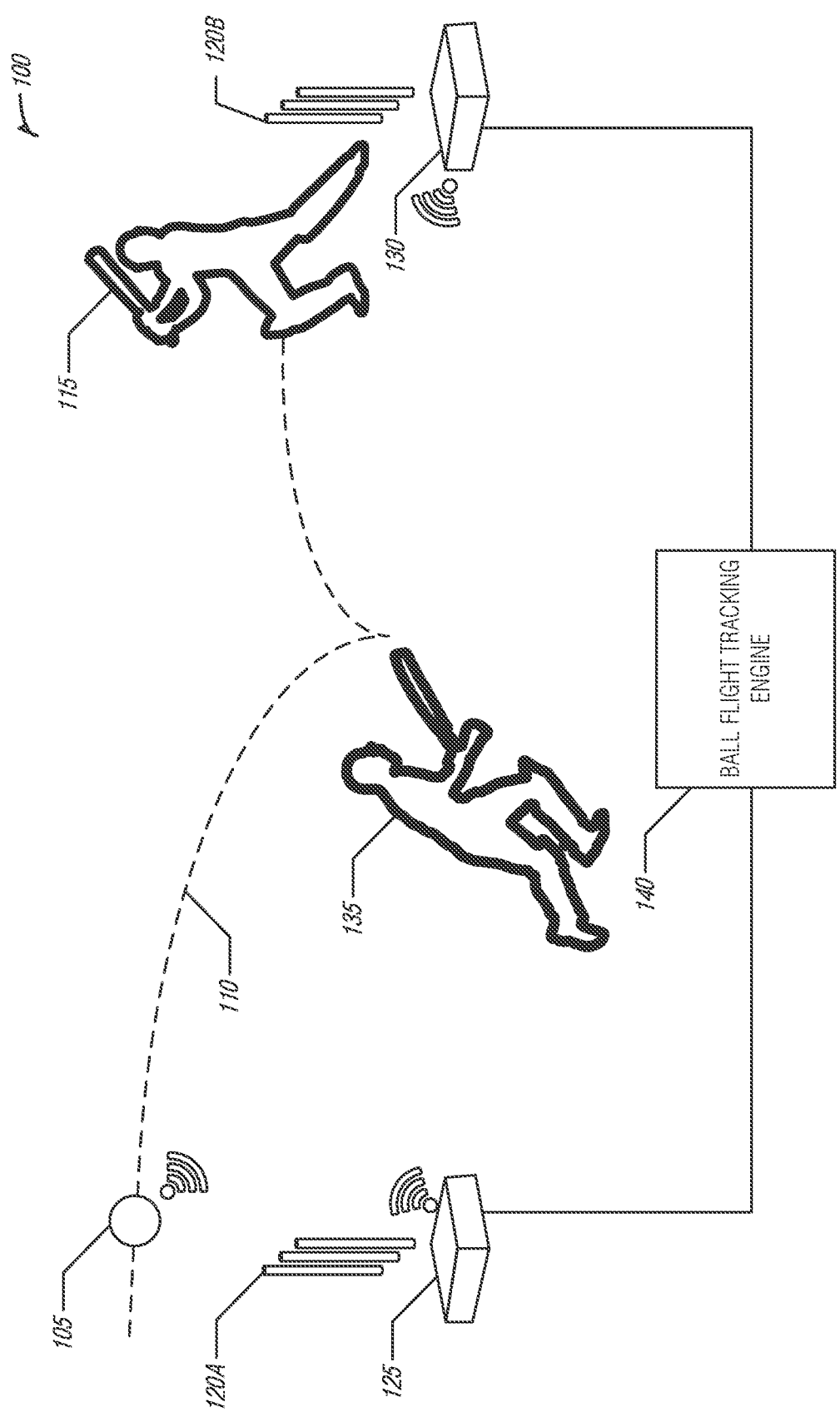
FIG. 1 is a block diagram of an example of an environment and system for sensor-derived object flight performance tracking, according to an embodiment.

Tracking ball flight performance may be beneficial to a player of ball-based sports (e.g., cricket, baseball, etc.). A player may be able to improve performance in a sport by identifying ball spin and trajectory information and using the information to make adjustments to throwing techniques (e.g., bowling, pitching, etc.). However, the human eye may not be sensitive enough to identify the flight characteristics of a ball traveling at a high rate of speed. Traditional approaches to identifying ball flight characteristics may alter the ball or may not provide the accuracy desired to identify flight information useful in making adjustments to throwing techniques.

High end cameras may be used to identify ball flight characteristics. However, the cameras may be expensive (e.g., $100,000+) and may be placed far away from the ball with markings or instrumentation on the exterior of the ball. While less expensive cameras may be placed nearer the ball (e.g., at the wickets in cricket, etc.) without external markings or instrumentation. However, with no markers on the ball, spin tracking and de-blurring may be challenging even with the best cameras. In addition, cameras in the field of play may occasionally be occluded by players and may suffer in low light. Low end cameras may provide poor ball flight tracking results even with external markers on the ball.

Radio-Frequency Identification (RFID) tags on the ball with readers placed in the field of play (e.g., at wickets) may have a lower price point (e.g., $2000). However, the rapidly spinning RFID tags may exhibit continuous disconnections resulting in incomplete datasets. Further, a ball (e.g., cricket ball) may be continuously rubbed to maintain shine which may be used to affect the ball's swing and spin. Placing antennas on the surface of the ball may be impractical as it may alter the flight of the ball and may interfere with natural mechanics of the sport (e.g., hitting the ball, etc.).

WiFi based tracking solutions may be impractical under the constraints of high speed and spin, centimeter (cm) scale accuracy, and availability of a very few base stations on the two-dimensional ground which may make 3D tracking difficult due to dilution of precision (DoP). Laser rangers and acoustic reflection techniques may also yield poor ball flight tracking results as reflections from the small cross-sectional area of the ball may yield high false positives.

By placing sensors within the ball and using two or more wireless anchors (e.g., ultra-wideband (UWB) radio receivers) accurate ball flight information may be obtained without impacting the natural mechanics of the sport or the exterior of the ball. The sensors may be placed in ball and sustain the impacts associated with sports such as, for example, cricket. The wireless anchors may offer the ability to calculate time of flight which may be a pre-requisite for analyzing extremely fast moving balls (e.g., moving >80 miles/hour). In addition, the solution may be more cost effective than using other techniques.

A processor, sensors (e.g., inertial measurement unit (IMU), etc.), and a radio (e.g., UWB radio, etc.) may be sealed in a plastic polymer box and snug fitted into a hole (e.g., to avoid rattling). For example, the two halves of the ball may be closed shut and a hole may be drilled to bring out a universal serial bus (USB) port to the surface for recharging. The sensor data may be stored on a local flash memory device or may be streamed through the radio to a nearby wireless anchor.

The wireless anchor may be placed in the field of play (e.g., at each wicket). The radio may be IEEE 802.15.4 compliant with support for 3.5 to 6.5 GHz bands (e.g., 12 channels) and a bandwidth of 500 MHz (e.g., data rates of up to 6.8 Mbps). The radio may operate under low power with sleep current at 100 nanoamps. The ball may contain a single antenna (e.g., due to space restrictions). One of the wireless anchors may include a 2-4 antenna multiple input multiple output (MIMO) radio. Radio signals may be exchanged between the ball and wireless anchors to compute the ball's range as well as the angle of arrival (AoA) using the phase differences at different antennas. The range and AoA information may be combined to estimate trajectory. The sensors inside the ball may send out the data for off-ball processing for spin analytics.

While examples provided herein may generally discuss a ball, it may be understood that the techniques discussed may be applicable to tracking the flight of a variety of objects.

FIG. 1 is a block diagram of an example of an environment 100 for sensor-derived object flight performance tracking, according to an embodiment. The example environment 100 generally illustrates a ball being used in a cricket game. The environment 100 includes a ball 105 traveling along a flight path 110, a striking batsman 115, wickets 120A and 120B, a bowler-side wireless anchor 125, a batsman-side wireless anchor 130, and a running batsman 135. The ball 105 is communicatively coupled (e.g., via radio frequency, ultra-wideband radio, etc.) to the bowler-side wireless anchor 125 and the batsman-side wireless anchor 130. The bowler-side wireless anchor 125 and the batsman-side wireless anchor 130 are communicatively coupled (e.g., via wireless network, wired network, shared bus, etc.) to a ball flight tracking engine 140.

The ball 105 may include a central processing unit, a sensor array including a variety of sensors, and a radio transceiver. In some examples, the ball 105 may include a storage device such as, for example, a flash memory module. In some examples, the ball 105 may include a universal serial bus (USB) port for battery charging and data transfer. In some examples, the ball 105 may include circuitry for wireless charging. The ball 105 may be thrown by a bowler (not shown) to the striking batsman 115. For example, the bowler may run up to the wicket 120A and release the ball 105 along a flight path 110 to the striking batsman 115 positioned in front of the wicket 120B.

The sensor array in the ball 105 may include a variety of sensors including, for example, an accelerometer, a gyroscope, and a magnetometer. The sensors in the ball 105 may observe inertial information such as, for example, acceleration (e.g., gravitational force), rotation (e.g., angular velocity), and direction (e.g., magnetic north). For example, at the time of release, the sensors may obtain the orientation of the ball 105, acceleration of the ball 105, and angular velocity of the ball 105. The data may be transmitted via the radio transceiver to another device and/or the data may be stored in and onboard storage device. The sensor array and the radio transceiver may be coupled to the central processing unit. The central processing unit may use instructions to determine the data to be collected by the sensor array and what data to be stored or transmitted by the radio transceiver. In addition, the central processing unit may process incoming signals from the sensor array and the radio transceiver.

The ball 105 may communicate (e.g., via the radio transceiver) with the bowler-side wireless anchor 125 and the batsman-side wireless anchor 130 via radio signal (e.g., ultra-wideband radio frequency, etc.). For example, the ball 105 may transmit sensor data to the bowler-side wireless anchor 125 and/or the batsman-side wireless anchor 130. The ball 105 may transmit a poll to one or both of the bowler-side wireless anchor 125 and the batsman-side wireless anchor 130. One or both of the bowler-side wireless anchor 125 and the batsman-side wireless anchor 130 may transmit back to the ball 105 a response. In return, the ball 105 may transmit back to one or both of the bowler-side wireless anchor 125 and the batsman-side wireless anchor 130 a final packet. In the example, the packet transmissions may be used to determining ranging information for the ball 105 in relationship to one or both of the bowler-side wireless anchor 125 and the batsman-side wireless anchor 130.

Each of the bowler-side wireless anchor 125 and the batsman-side wireless anchor 130 may include a wireless transceiver (e.g., an ultra-wideband radio transmitter and receiver, etc.). In some examples, the one or both of the bowler-side wireless anchor 125 and the batsman-side wireless anchor 130 may be configured for multiple input multiple output (MIMO) using multiple antennas. The bowler-side wireless anchor 125 and the batsman-side wireless anchor 130 may be communicatively coupled to the ball flight tracking engine 140.

The ball flight tracking engine 140 may include a variety of components that work in conjunction to calculate ball flight information for the ball 105. For example, the ball flight tracking engine 140 may calculate information about the ball 105 including spin at a particular time during flight, trajectory, time of flight, initial orientation at release, bounce, angle of arrival, etc.

The ball flight tracking engine 140 may use sensor data from the ball 105 and information from one or both of the bowler-side wireless anchor 125 and the batsman-side wireless anchor 130 to determine spin metrics of the ball 105. For example, three main spin-related metrics are of interest to Cricketers: (1) revolutions per second, (2) rotation axis, and (3) seam plane. From a sensing perspective, all these three metrics may be derived if the ball's three-dimensional (3D) orientation is tracked over time. The ball flight tracking engine 140 may use orientation, rotation, and coordinate frameworks in calculating spin metrics for the ball 105.

The orientation of the ball 105 is the representation of the local X, Y, and Z axes of the ball 105 as vectors in a global coordinate frame. A rotation of the ball 105 is a change of orientation and may be decomposed into a sequence of rotations around the local X, Y, and Z axes of the ball 105. Put differently, any new orientation may be achieved by rotating the ball 105 by appropriate amounts on each of the three axes one after the other. A gyroscope in the ball 105 measures each of these rotations per unit time (e.g., angular velocity). Thus, if the initial orientation of the ball 105 is known in the global coordinate frame, then subsequent orientations may be tracked by integrating the gyroscope-measured angular velocity across time.

Figure 3:
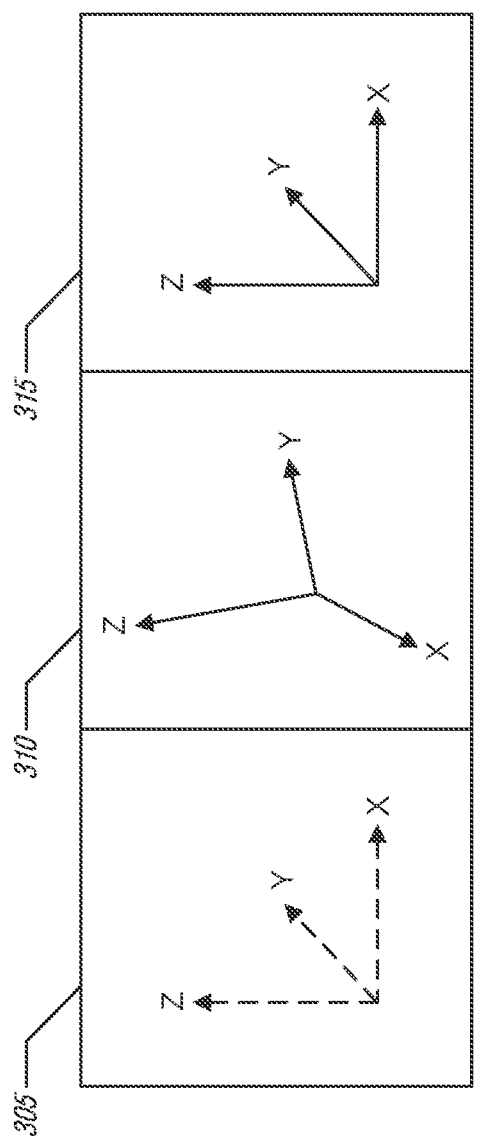
FIG. 3 illustrates an example of rotating local axes to align local directions of gravity and magnetic north with global directions for sensor-derived object flight performance tracking, according to an embodiment.

Expressing the initial orientation of the ball 105 in the global framework leverages the knowledge that gravity and magnetic North fall along globally known directions. Thus, the local axes of the ball 105 may be rotated until the local representation of gravity and North align with the known global directions. FIG. 3 element 305 shows a global frame $\{X_g, Y_g, Z_g\}$ with its $X_g$ pointing East, $Y_g$ pointing North, and $Z_g$ pointing up against gravity. FIG. 3 element 310 shows an object (e.g., the ball 105) in an unknown orientation. FIG. 3 element 315 shows the object rotated around the X axis until the measured gravity is along its own −Z direction; it may be rotated again around this −Z axis until the measured magnetic field (e.g., compass) is along its own Y axis. Thus, the local and global frameworks have fully aligned and the total rotation may be expressed as a single matrix R.

$$[XYZ]R = [X_g Y_g Z_g]$$

Returning to FIG. 1, the orientation of the ball 105 is defined as $R^O$—the inverse of this rotation matrix, $R^{-1}$. Therefore, if the adjustment of the ball 105 is a clockwise rotation of 30° to align with the global framework, then the orientation of the ball 105 is 30° counter-clockwise. Thus, the ball flight tracking engine 140 computes both initial orientation and angular velocity. The ball flight tracking engine 140 uses the computed initial orientation and angular velocity to calculate and track spin related analytics.

The ball flight tracking engine 140 accommodates several challenges in tracking in-flight objects such as ball 105 that may hinder the effectiveness of traditional techniques such as, for example, the gyroscope may be noisy and noise-based errors may accumulate because rotation is a time-integral of angular velocity, the gyroscope may saturate at around five revolutions/sec (rps) (in cricket, amateur bowlers may spin the ball 105 at 12 rps and professionals may spin the ball 105 more than 30 rps), and gravity may not be measured in accelerometers during flight which may preclude opportunities to rotate and align the local coordinate frame. Thus, known techniques may experience difficulties in computing initial orientation and/or rotation while the ball 105 is in flight.

The ball flight tracking engine 140 takes uses two central observations. First, in the absence of air-flow, there may be no external torque on the ball implying that the rotation of the ball 105 may be restricted to a single axis throughout the flight (e.g., the axis around which the ball 105 was rotated by the bowler). Second, from the local reference frame of the ball 105 the magnetic north vector spins around some axis. Given a single rotation axis, the ball flight tracking engine 140 may infer from the magnetometer the axis of rotation and measure both magnitude and direction of rotation. Air-drag may cause additional rotations of the ball 105. This may pose a challenge for traditional techniques.

Figure 4:
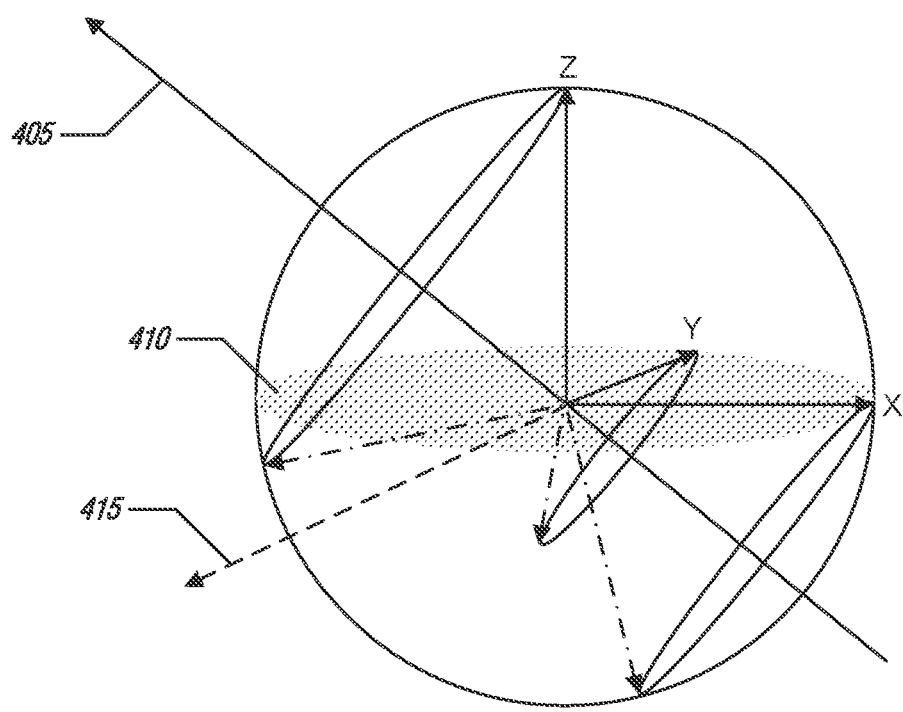
FIG. 4 illustrates an example of the movement of a ball rotating around a constant rotation axis in a global framework for sensor-derived object flight performance tracking, according to an embodiment.

The mass of the ball 105 may be symmetrically distributed and its center of mass may be precisely at the center. With gravity forces alone and no air drag the ball may not change its rotating state because no torque is generated from gravity (e.g., conservation of angular momentum). The dimension of this rotational motion may be limited to 1 because the motion may be continuously expressed around a single axis, $R^G$. FIG. 4 illustrates the situation—each local X, Y, Z axis rotates in different cones around the same $R^G$ 405. The magnetic north may also be a fixed vector $N^G$ 415 in the global framework. The seam plane 410 is used as a positional reference for the ball 105. Henceforth, superscript G indicates a vector being observed by the ball flight tracking engine 140 in the global framework and superscript L indicates that a vector is being observed in the local framework.

Figure 5:
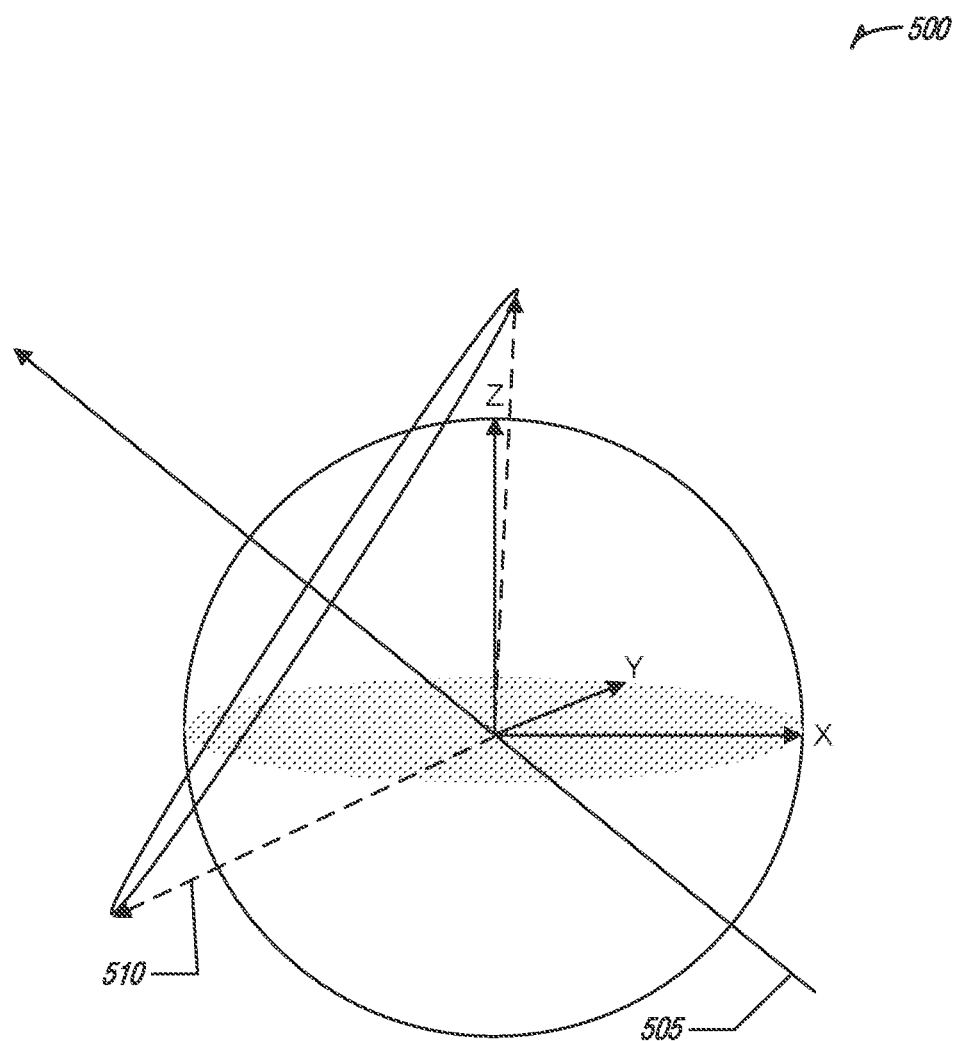
FIG. 5 illustrates an example of the magnetic vector rotating around a local rotation axis in a local framework for sensor-derived object flight performance tracking, according to an embodiment.

In the local coordinate system, FIG. 5 shows that the local X, Y, and Z axes may be fixed, but the magnetic vector $N^L$ 510 rotates in a cone around a fixed local vector $R^L$ 505. Because magnetometers may reliably measure a single dimension of rotation, the ball flight tracking engine 140 measures the parameters of the cone. Thus, the low-dimensional mobility of the ball 105 during free-fall allows use of the magnetometer to serve as a gyroscope.

Figure 6:
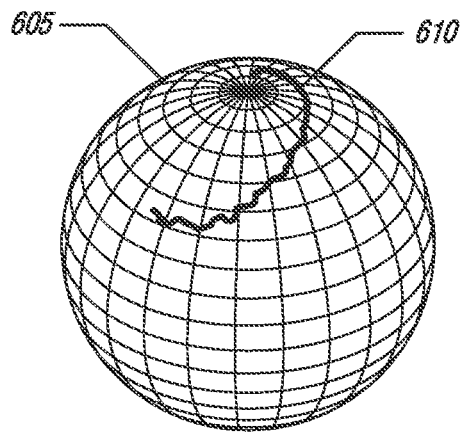
FIG. 6 illustrates an example of model of a calculated local rotation axis moving on the surface of a sphere for sensor-derived object flight performance tracking, according to an embodiment.

With air-drag, the ball may still continue to rotate around the same global axis $R^G$, but may experience an additional rotation along a changing axis. To envision this, consider the ball spinning around the global vertical axis with the seam on the horizontal plane. With air-drag, the ball may continue to spin around the identical vertical axis, but the seam plane may gradually change to lie on the vertical plane. This is called "wobble" and may be modeled by the ball flight tracking engine 140 as a varying local rotation axis, $R^L$ 505. FIG. 6 shows the locus of $R^L$ 610 as it moves in the local framework. Thus, the center of the $N^L$ cone is moving on the sphere surface 605, even though the width of the cone remains unchanged. This poses a challenge to computing rotations from the magnetometer included in the ball 105.

However, if two non-collinear vectors may be observed by the ball flight tracking engine 104 in the local framework and their representations known by the ball flight tracking engine 140 in the global frame, then the orientation of the ball 105 may be resolved by the ball flight tracking engine 140. The ball flight tracking engine 104 mathematically expresses the orientation of the ball 105 at time t as a rotation matrix $R_{O(t)}$. The rotation matrix is a function of the globally fixed vectors (e.g., rotation axis and magnetic north) and the locally measured counterparts.

$$R_{O(t)} = [R^G N^G R^G \times N^G][R_{(t)}{}^L N_{(t)}{}^L R_{(t)}{}^L \times N_{(t)}{}^L]^{-1}$$

$R^G$ and $N^G$ are the rotation axis and magnetic north vectors, respectively—both are in the global framework and may be constant during flight. The third column vector, $(R^G \times N^G)$, is a cross product used by the ball flight tracking engine 140 to equalize the matrix dimensions on both sides. $N_{(t)}{}^L$ is the local magnetic vector measured by the magnetometer, $[m_x, m_y, m_z]^T$. $R_{(t)}^L$ is the local rotation axis which is slowly changing during the flight of the ball. The ball flight tracking engine 140 uses $R_{(t)}^L$ as the centerline of the instantaneous $N_{(t)}^L$ cone.

Figure 7:
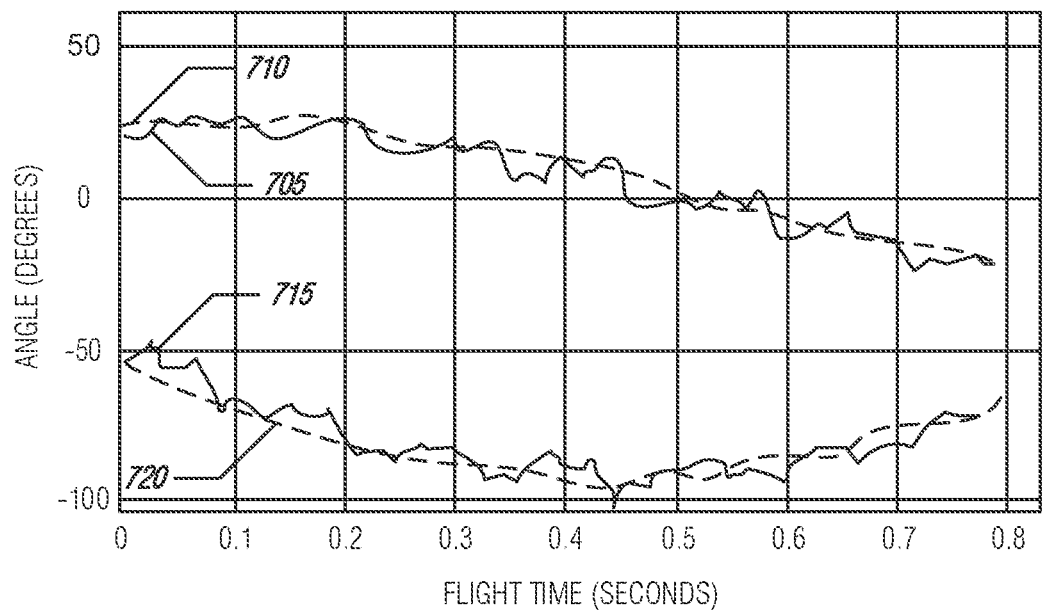
FIG. 7 illustrates an example of a graph of estimation of a local rotation axis using cone fitting for sensor-derived object flight performance tracking, according to an embodiment.

The ball flight tracking engine 140 estimates two of the unknowns, namely $R^G$ and time varying $R_{(t)}^L$. Because $R^G$ remains constant, the ball flight tracking engine 140 resolves it at the beginning of the flight of the ball—the same value may be used through the entire flight of the ball 105. $R_{(t)}^L$ is moving on the sphere of the ball 105 and the magnetic north may be constantly rotating around it. Because $N_{(t)}^L$ forms a cone around $R_{(t)}^L$, tracking $R_{(t)}^L$ is equivalent to tracking the centerline of the cone. Given that 3 non-coplanar unit vectors determine a cone, the ball flight tracking engine 140 fits a cone using 3 consecutive measurements: $N_{(t-1)}^L$, $N_{(t)}^L$ and $N_{(t+1)}^L$. FIG. 7 shows ground truth elevation 705, estimated elevation 705, ground truth azimuth 715, and estimated azimuth 720. The estimation calculated by the ball flight tracking engine 140 follows the true $R_{(t)}^L$ trend, but may be noisy.

The noise in $R_{(t)}^L$ estimation may translate to orientation error. The noise may not be reduced by fitting the cone over larger number of magnetometer measurements—this is because the cone may have moved considerably within a few sampling intervals. Because the ball's flight time is short (e.g., less than a second), the ball flight tracking engine 140 describes the azimuth and elevation changes in $R_{(t)}^L$ as a quadratic function of time t.

$$R_{(t)}^L = \begin{bmatrix} \cos(\theta_t)\cos(\varphi_t) \\ \cos(\theta_t)\sin(\varphi_t) \\ \sin(\theta_t) \end{bmatrix}$$

Elevation $\theta_t = A_{el}t^2 + B_{el}t + C_{el}$

Azimuth $\varphi_t = A_{az}t^2 + B_{az}t + C_{az}$.

Put differently, the ball flight tracking engine models the motion of a moving cone under the constraints that the center of cone is moving on a quadratic path (e.g., on the surface of the sphere) and that the cone $\theta_{NR} = \angle(N_{(t)}^L, R_{(t)}^L)$ as measured over time. The ball flight tracking engine 140 expresses this function as argmin Var$[\angle(R_{(T)}^L, N_{(T)}^L), \angle(R_{(T+1)}^L), (N_{(T+1)}^L) \ldots]$ where T is the moment the ball is released. The ball flight tracking engine 140 derives the initial condition to this optimization function from a smoothened version of the basic cone fitting approach, shown in FIG. 7. Azimuth and elevation are latitudinal and longitudinal directions on the sphere's surface and a point on the sphere may be expressed by the ball flight tracking engine 140 as a tuple of these two angles.

Figure 8:
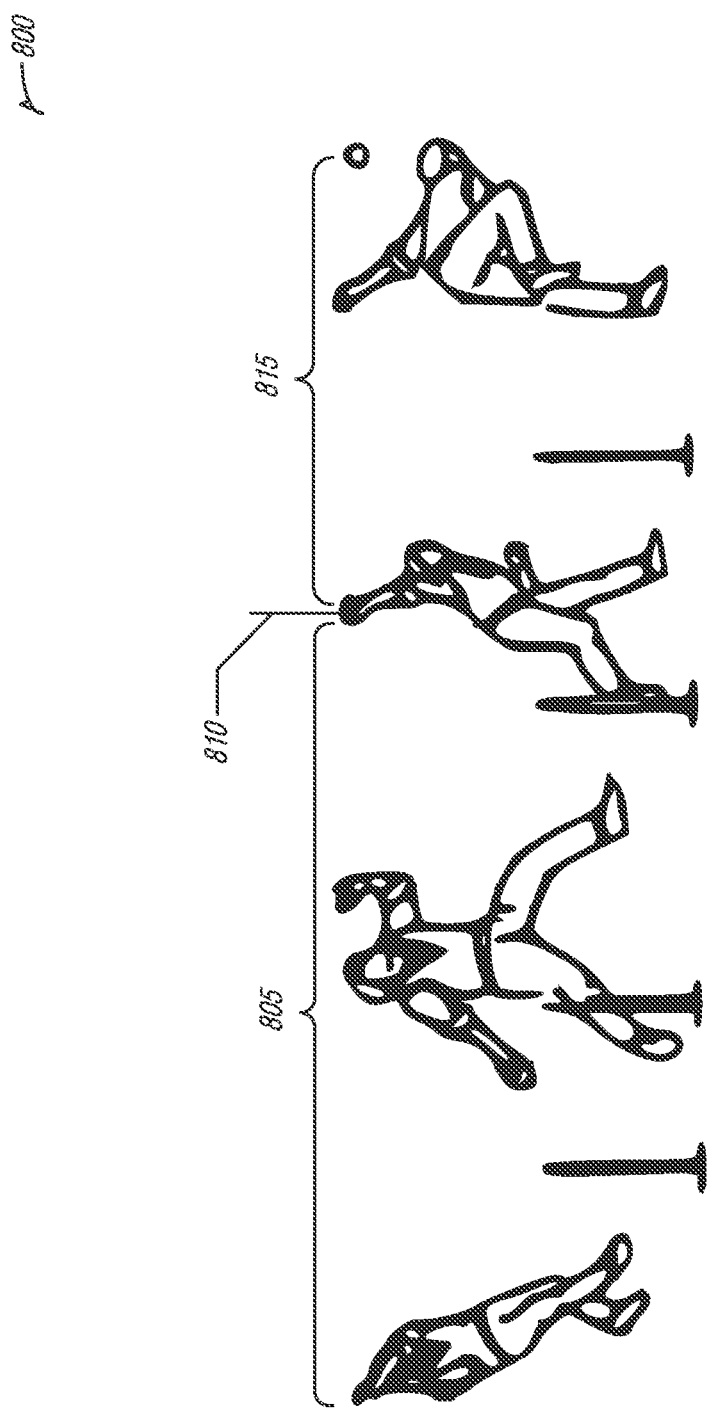
FIG. 8 illustrates an example diagram of phases of flight of a ball thrown by a cricket bowler.

FIG. 8 shows two phases of ball tracking comprising a pre-flight phase 805 and an in-flight phase 815. The tracking of $R_{(t)}^L$ is completed by the ball flight tracking engine 140 while the ball 105 is spinning during the in-flight phase 815. The ball flight tracking engine 140 calculates the global rotation axis, $R^G$, during the pre-flight phase 805 up to the release 810 of the ball 105 to solve for orientation $R_{O(t)}$.

Sensor data during the flight may indicate where $R_{(t)}^L$ is pointing (e.g., the center of the $N_{(t)}^L$ cone) but it may not reveal information about $R^G$. However, the ball flight tracking engine 140 uses the rotation axis $R^G$ and magnetic vector $N^G$ as constant vectors. The angle between these two vectors, $\angle(N^G, R^G)$ is the same as the local $N_{(t)}^L$ cone angle $\theta_{NR}$. Thus, $R^G$ may be calculated by the ball flight tracking engine 140 as lying on a cone around $N^G$ whose cone angle is $\theta_{NR}$. The ball flight tracking engine 140 may use the circle of the cone a starting point to determine the point on the cone's circle corresponding to $R^G$.

The ball flight tracking engine 140 uses sensor measurements from the pre-flight phase (e.g., FIG. 8 pre-flight phase 805) to determine the point on the cone's circle corresponding to $R^G$. Because this is not free-fall, and the ball 105 may not be spinning fast, the gyroscope and accelerometer may both provide useful data to the ball flight tracking engine 140. The ball flight tracking engine 140 identifies a stationary time point to compute the initial orientation of the ball 105 and uses the gyroscope thereafter to integrate rotation until the point of release (e.g., FIG. 8 ball release 810), T. The ball flight tracking engine 140 obtains the orientation of the ball 105 at T, denoted as $R_{O(T)}$, and uses the following equation to solve for the global rotation axis $R_{(T)}^G$.

$$R_{(T)}^G = R_{O(T)} R_{(T)}^L$$

The ball flight tracking engine 140 uses $R_{(T)}^G$ as the estimation of $R^G$ for the in-flight phase (e.g., FIG. 8 in-flight phase 815).

Figure 9:
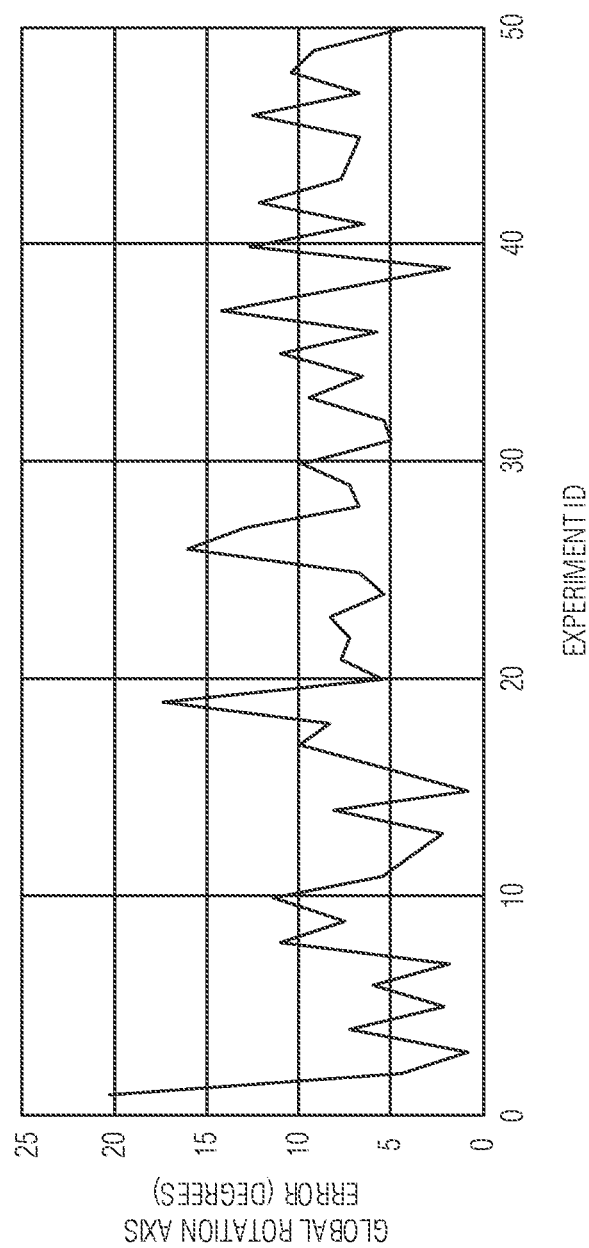
FIG. 9 illustrates an example of a graph of global rotation axis error in a sample set for sensor-derived object flight performance tracking, according to an embodiment.

While gyroscope noise and saturation may render $R_{(T)}^G$ erroneous, because the ball may not spin rapidly while in the hand (e.g., less than 1 revolution) and the angular velocity may saturate the gyroscope at the last few moments before ball-release, the ball flight tracking engine 140 calibrates $R_{(T)}^G$ using the cone angle restriction. FIG. 9 shows small $R_{(T)}^G$ error from 50 experiments.

The ball flight tracking engine 140 uses the following algorithm to track ball orientation during flight: (1) get coarse $R_{(t)}^L$ by combining 3 consecutive magnetometer measurements, (2) use them as the initial starting point to search for parameters that minimize Var $[N_{(t)}^L$ cone angles], (3) compute cone angle $\theta_{NR}$=Mean $[N_{(t)}^L$ cone angles], (4) use gyroscope to track ball's orientation at the release time $R_{O(T)}$, (5) get global rotation axis during flight $R^G$ $R_{O(T)}R_{(T)}^L$, (6) calibrate $R^G$ using $\theta_{NR}$, and (7) compute the ball's orientation at a point in time (t) of flight.

The ball flight tracking engine 140 may also calculate location related metrics for the ball 105. For example, location related analytics in Cricket may be interested in metrics including, for example, distance to first bounce (e.g., length), direction of ball motion (e.g., line), and speed of the ball 105 at the end of the flight. These metrics may be derivatives of the 3D trajectory of the ball 105. The ball flight tracking engine 140 formulates a parametric model of the trajectory to estimating the 3D trajectory. The ball flight tracking engine 140 fuses time of flight (ToF) calculated using packets transmitted (e.g., via UWB radio) between the ball 105 and the bowler-side wireless anchor 125 and the batsman-side wireless anchor 130, angle of arrival (AoA), physics motion models, and dilution of precision (DoP) constraints to estimate the 3D trajectory of the ball 105. The ball flight tracking engine 140 uses a gradient descent approach to minimize a non-linear error function resulting in an estimate of the 3D trajectory of the ball.

The ball 105 sends a POLL, the wireless anchor (e.g., bowler-side wireless anchor 125, batsman-side wireless anchor 130) sends back a RESPONSE, and the ball 105 responds with a FINAL packet. The ball flight tracking engine 140 uses the two round trip times and the corresponding turn-around delays to compute the time of flight. This approach may reduce the utilization of time synchronization between the devices (e.g., the ball 105, the bowler-side wireless anchor 125, and the batsman-side wireless anchor 130). The ball flight tracking engine 140 multiplies the round trip times by the speed of light to determine the range of the ball 105. For example, UWB radios may offer time resolution at 15.65 ps which may allow the ball flight tracking engine 140 to calculate time of flight with reduced error (e.g., 15 cm error).

Figure 10:
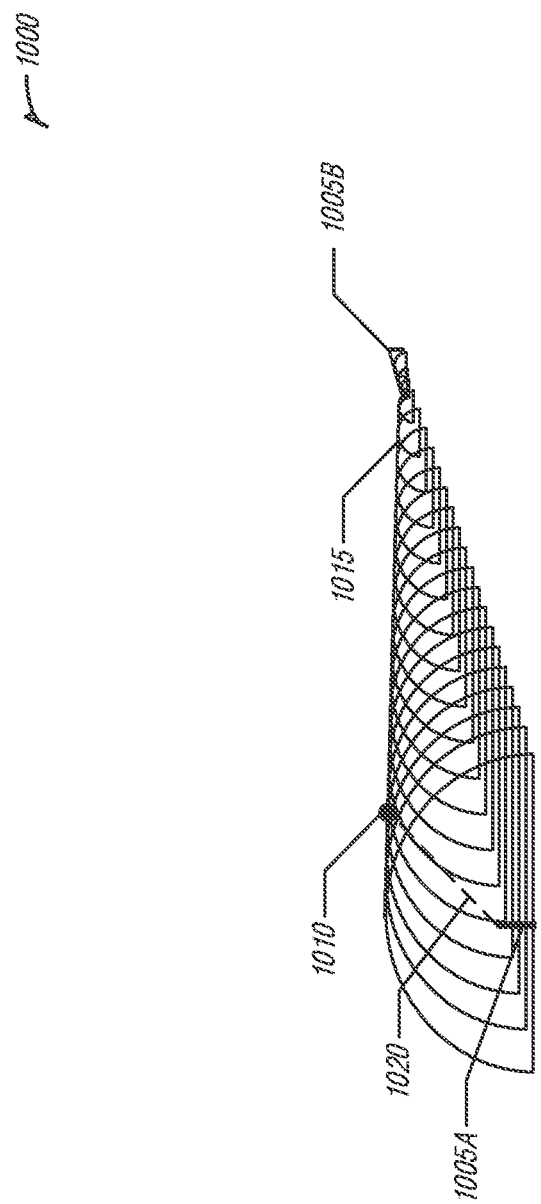
FIG. 10 illustrates an example diagram of ranging a ball along a flight path using wireless anchors for sensor-derived object flight performance tracking, according to an embodiment.

The ball flight tracking engine 140 may not be able to use ranging from two wireless anchors to directly resolve the 3D location of the ball 105. However, in many ball-based sports, placing additional wireless anchors may not be feasible because it may interfere with the motion of the ball 105 and players (e.g., striking batsman 115, running batsman 135, etc.) and placing wireless anchors outside the field (e.g., 90 m away from the wickets) may degrade signal to noise ratio (SNR) and ranging accuracy. FIG. 10 shows the intersections of two wireless anchor measurements from a first wireless anchor 1005A (e.g., bowler-side wireless anchor 125) and a second wireless anchor 1005B (e.g., batsman-side wireless anchor 130). The ball flight tracking engine 140 estimates that the range 1020 of the ball 1010 (e.g., ball 105) lies along circles formed by the intersection of two spheres centered at the wireless anchors 1005A and 1005B. At a given time along the flight path 1015 (e.g., flight path 110), the ball may lie on any point of a circle. Without knowing the initial position and velocity of the ball 105, many 3D trajectories may satisfy these constraints.

Figure 11:
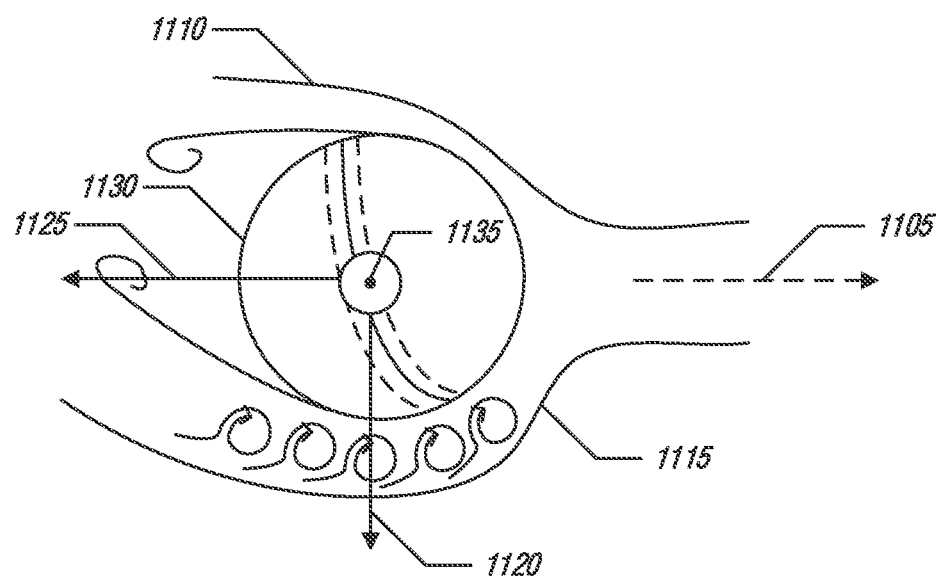
FIG. 11 illustrates an example diagram of unbalanced airflow due to asymmetric smoothness on a ball's side causing side force.

The ball flight tracking engine 140 uses two mobility constraints to resolve the uncertainty: (1) physics of ball motion, and (2) the bouncing position of the ball 105. FIG. 11 shows a free-body diagram depicting the forces acting on a ball 1130 (e.g., ball 105) while in flight. Besides the force of gravity 1120, aerodynamic forces may be acting on the ball 1130. For example, in cricket the ball surface may be smooth on one side of the seam and rough on the other. Cricket bowlers may continue to polish the smooth side during the game. Surface texture disparity may cause unbalanced air-flow which in turn may cause a side force 1135 The speed of the ball may cause a slight air drag force 1125. The magnitude and direction of the side forces may depends on the seam orientation, surface roughness, and velocity of the ball 1130. The ball flight tracking engine 140 may approximate the air drag force 1125 and side force 1135 coefficients as constants. For example, the side force 1135 may produce up to 1 m of lateral deflection in trajectory. Under the above forces, the ball flight tracking engine generates projectile path model for the ball 105.

Figure 12:
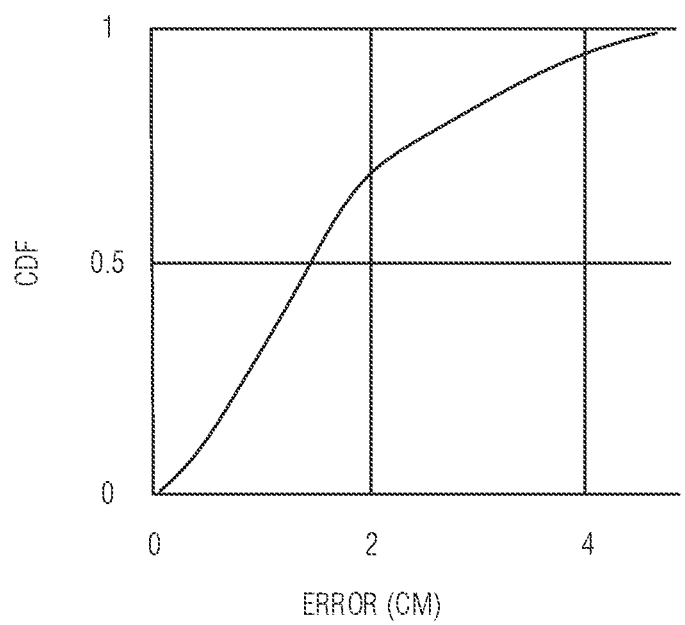
FIG. 12 illustrates an example of a graph of ranging error when using a motion model for sensor-derived object flight performance tracking, according to an embodiment.

FIG. 12 shows the extent to which the projectile path model without adjustment for the aerodynamic forces fits the ball's true trajectory. The projectile path model is seeded with initial location and initial velocity of the ball 105. The median error is 1 cm across 25 different throws of the ball, offering confidence on the usability of the projectile path model in indoor environments.

The ball flight tracking engine 140 detects when the ball 105 bounces based on a spike in accelerometer data. The ball flight tracking engine 140 sets the Z component (e.g., height) of the location of the ball 105 to zero (e.g., in relation to the ground, etc.). Thus the ball flight tracking engine 140 resolves Z component uncertainty at the bounce point. The ball flight tracking engine may compute the location of the ball 105 at the bounce point using ranging from the wireless anchors and the estimated height of zero. Thus, one point on the trajectory is known resulting in a smaller set of candidate trajectories. The ball flight tracking engine 140 fuses the physical constraints with the ranging information described in FIG. 10.

The ball flight tracking engine models the trajectory as an error minimization problem. The two anchor positions are denoted as $(x_{ia}, y_{ia}, z_{ia}) \forall i \in \{1, 2\}$. The initial location and initial velocity of the ball at the point of release from the hand is denoted as $(x_O, y_O, z_O)$ and $(v_x, v_y, v_z)$, respectively. Thus, at a given time t, the ball flight tracking engine estimates the location of the ball from projectile path models without aerodynamics as: $S_{xe}(t)=x_o+v_x t$, $S_{ye}(t)=y_o+v_y t$, $S_{ze}(t)=z_o+v_z t-0.5\ gt^2$. Here, g is acceleration due to gravity. Using this formula, the range from each anchor i may be parameterized by the ball flight tracking engine 140 as:

$$R_{ip}(t) = \sqrt{(S_{xe}-x_{ia})^2+(S_{ye}(t)-y_{ia})^2+(S_{ze}(t)-z_{ia})^2}.$$

The ball flight tracking engine 140 then uses an error function, Err, as a difference of the parameter-modeled range and the measured range. Specifically:

$$\operatorname*{argmin}_{6params} Err = \sum_{i=1,2} \sum_t \{R_{i,p}(t) - R_{i,m}(t)\}^2$$

The ball flight tracking engine minimizes the Err function using a gradient descent algorithm. However, given the function may be highly non-convex, multiple local maxima may exist. The ball flight tracking engine 140 bounds the search space based on 2 boundary conditions: (1) the Z coordinate of the bouncing location is zero, and (2) The initial ball-release location is assumed to be within a 60 cm³ cube, as a function bowler's height.

Figure 13:
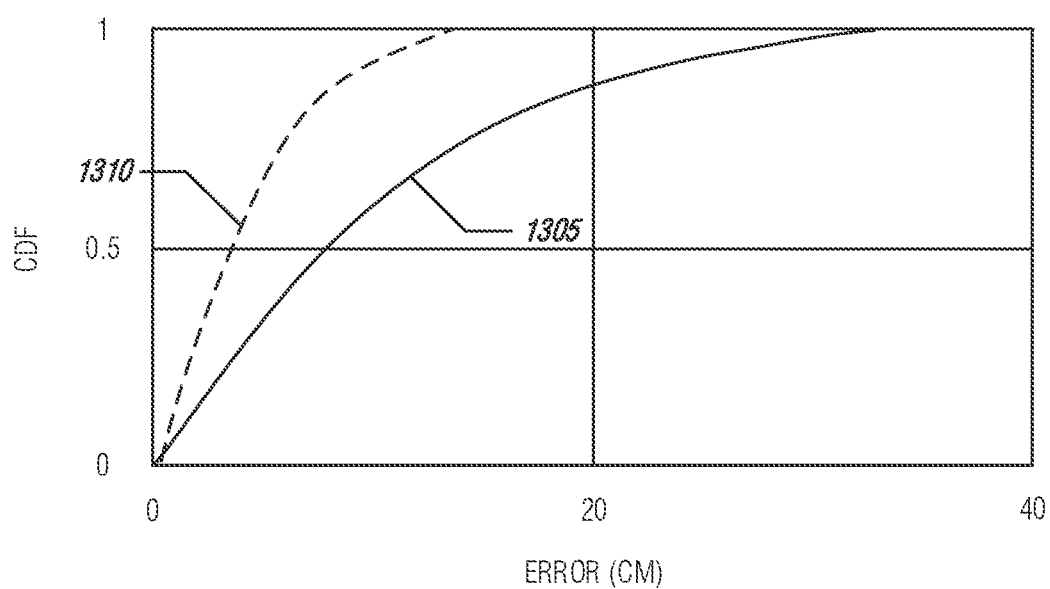
FIG. 13 illustrates an example of a graph of ranging error when fusing wireless anchor ranging with a motion model for sensor-derived object flight performance tracking, according to an embodiment.
Figure 14:
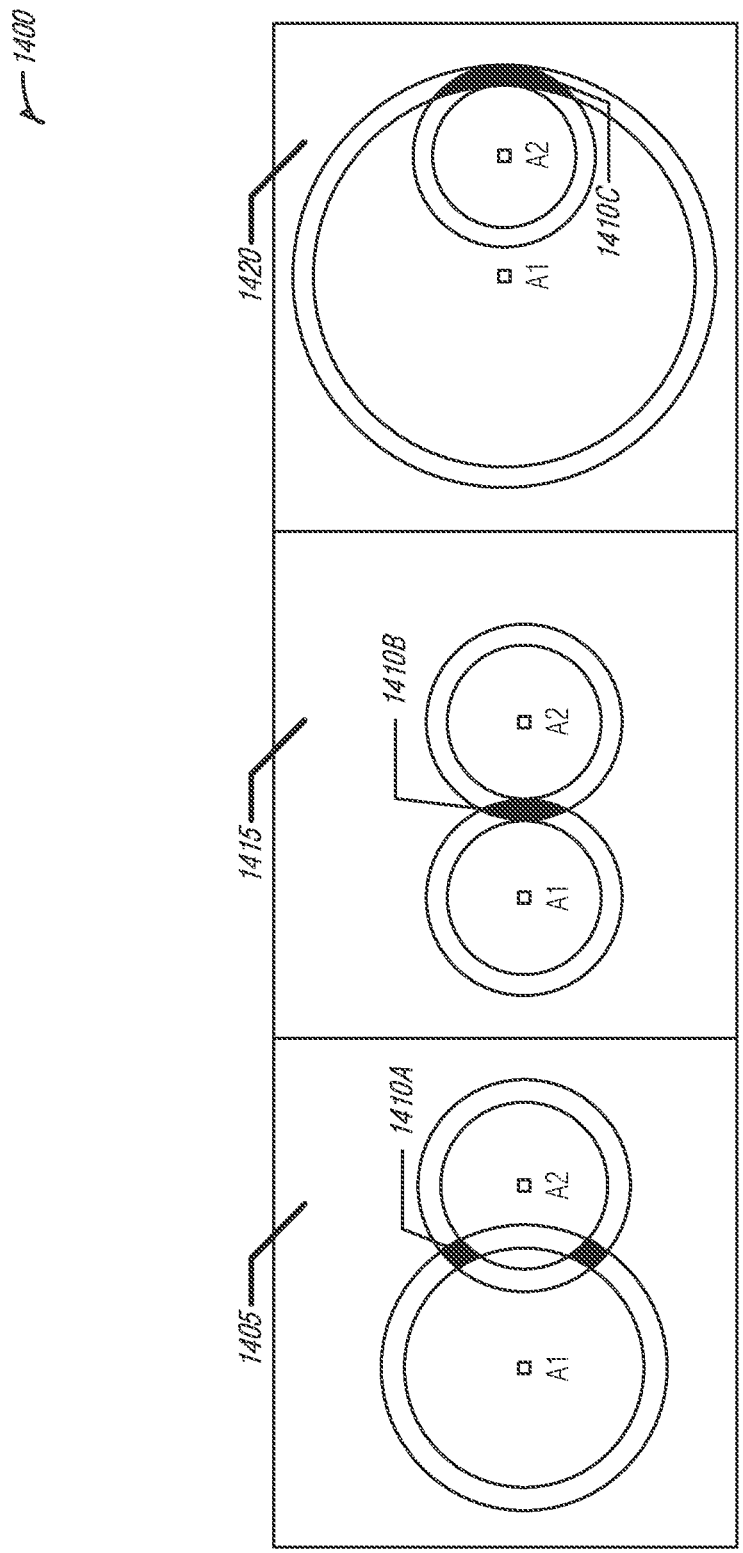
FIG. 14 illustrates an example diagram of dilution of precision introduced as a result of ranging errors, according to an embodiment.

FIG. 13 shows the reduction from the initial ranging error 1305 to the ranging error using the error reduction techniques described above 1310. Translating range to location may be affected by a phenomenon called dilution of precision (DoP). The intersection of two wireless anchor range measurements (e.g., two spheres centered at the anchors) is a circle and the ball 105 should be at some point on this circle. However, ranging error may cause the intersection of spheres to become 3D tubes. When the two spheres become nearly tangential to each other, for example, when the ball 105 is near the middle of two anchors, the region of intersections may become large. FIG. 14 shows the effect of large regions of intersections between the ranges of two wireless anchors (e.g., the bowler-side wireless anchor 125 and the batsman-side wireless anchor). DoP may affect the location estimate of the ball 105. DoP is a problem that may affect other trilateration applications such as, for example, global positioning systems (GPS). FIG. 14 element 1405 illustrates lower DoP when ranging circles are not tangential shown by overlapping of the circles 1410A, element 1415 illustrates higher DoP when circles externally tangential shown by overlapping of the circles 1410B, and element 1420 illustrates max DoP when circles internally tangential shown by overlapping of circles 1410C.

Figure 15:
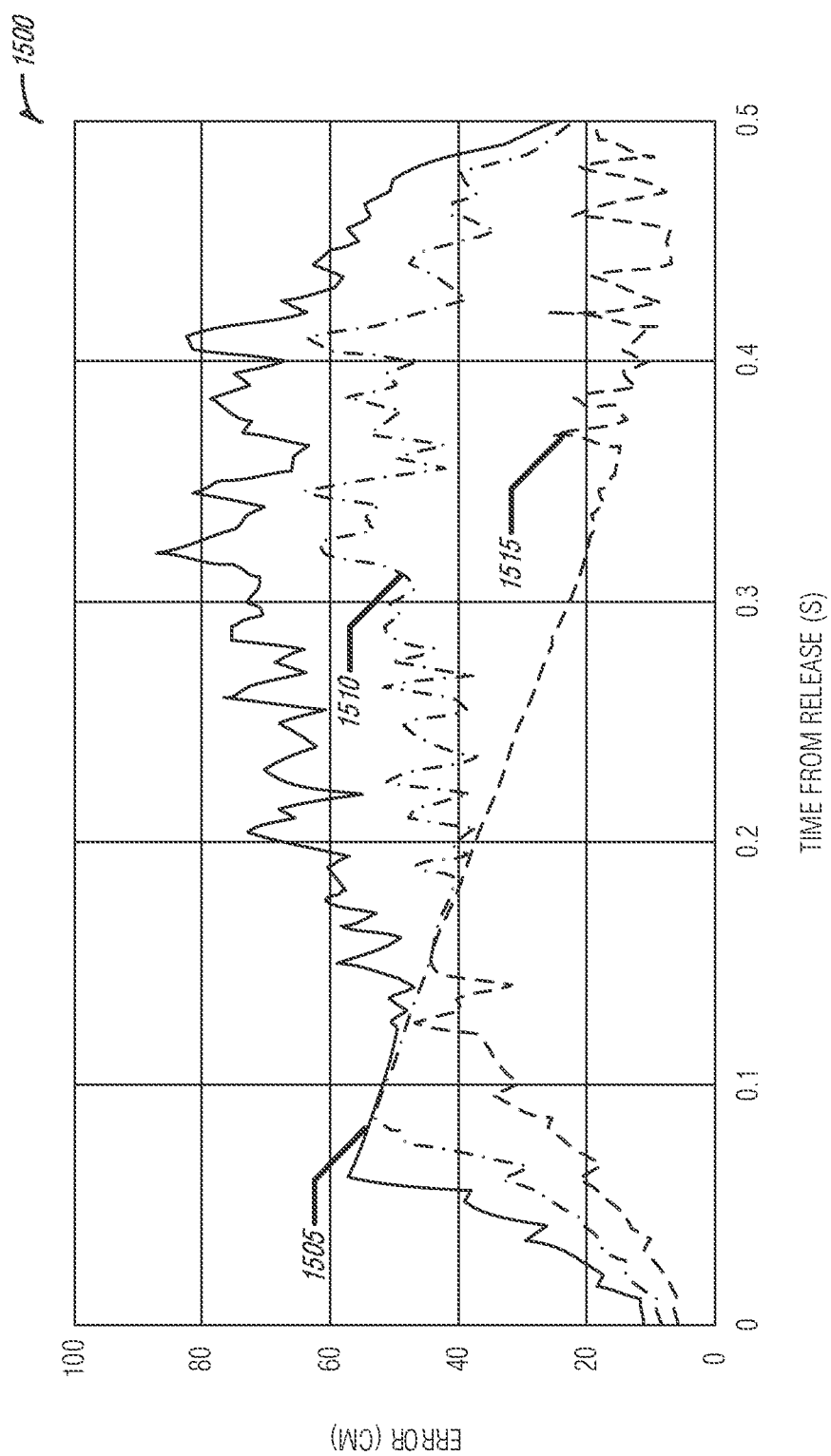
FIG. 15 illustrates an example of a graph of dilution of precision aggravating error rates, according to an embodiment.

FIG. 15 shows error variation as the ball 105 moves in flight at a 90 percentile 1505, a 75 percentile 1510, and a median 1515. As illustrated in FIG. 15, the error increases and is maximal near the middle of the flight. However, since the DoP may be modeled by the ball flight tracking engine 140 as a function of distance from the wireless anchors, the ball flight tracking engine weighs the errors in a minimization function.

$$\operatorname*{argmin}_{6params} Err = \sum_{i=1,2} \sum_t \left\{R_{i,p}(t) - R_{i,m}(t) \times \frac{1}{\sqrt{(DoP)}}\right\}^2$$

With this revision, the minimization function of the ball flight tracking engine 140 devalues range measurements weighted by a large DoP resulting in improved median error (e.g., 16 cm).

Figure 16:
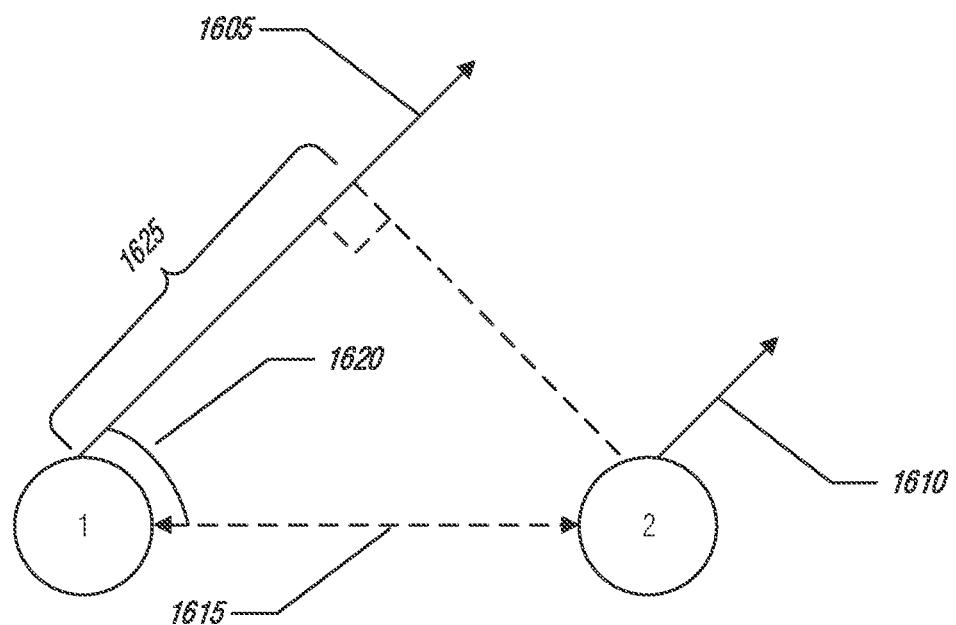
FIG. 16 illustrates an example diagram of measuring angle of arrival using phase differences between two antennas in a wireless anchor for sensor-derived object flight performance tracking, according to an embodiment.

The MIMO antennas at the wireless anchors (e.g., at the bowler-side wireless anchor 125) may be used by the ball flight tracking engine 140 to obtain synchronized phase measurements of incoming signals. FIG. 16 shows how the phase difference φ 1625 is a function of the difference 1615 in signal path $p_1$ 1605 and $p_2$ 1610, which is in turn related to AoA, θ 1620. Thus, the ball flight tracking engine 140 calculates phase difference and AoA using the formulas:

$$d\cos(\theta)\frac{2\pi}{\lambda} = \phi$$

$$\cos(AoA) = \cos(\theta) = \frac{\phi\lambda}{2\pi d}..$$

In some embodiments, a MIMO receiver may be deployed on one side (e.g., the bowler-side wireless anchor 125) of the flight path 110 of the ball 105 due to potential interference at the other end of the flight path 110 which may corrupt phase measurements. In such an embodiment, the antennas may be separated along the x-axis. The ball flight tracking engine 140 may express the AoA in terms of ball 105 location, wireless anchor locations, and measured ranges using the formulas:

$$\cos(\theta) = \frac{S_x - x_{ia}}{R_{ia}}$$

$$S_{x,aoa} = \cos(\theta)R_{ia} + x_{ia}.$$

Thus, the ball flight tracking engine 140 may refine the estimates of the trajectory of the ball 105 by including the AoA in the error function. DoP related issues may arise with AoA because as the ball travels further away from the wireless anchor the location error may increase for a small Δθ error in AoA. The error may be RΔθ, where R is the range of the ball 105.

AoA error may be a function of the antenna separation d—higher antenna separation may decrease the error in measurement of cos(θ) (e.g., AoA). However, with antenna separation d higher than wavelength λ, the phase may wrap and may introduce an ambiguity in the AoA estimation. This is called integer ambiguity. Unambiguous AoA measurement may be determined by the ball flight tracking engine 140 using the formulae $$d\cos\theta < \frac{\lambda}{2} \text{ or } d < \frac{\lambda}{2}.$$

Figure 17:
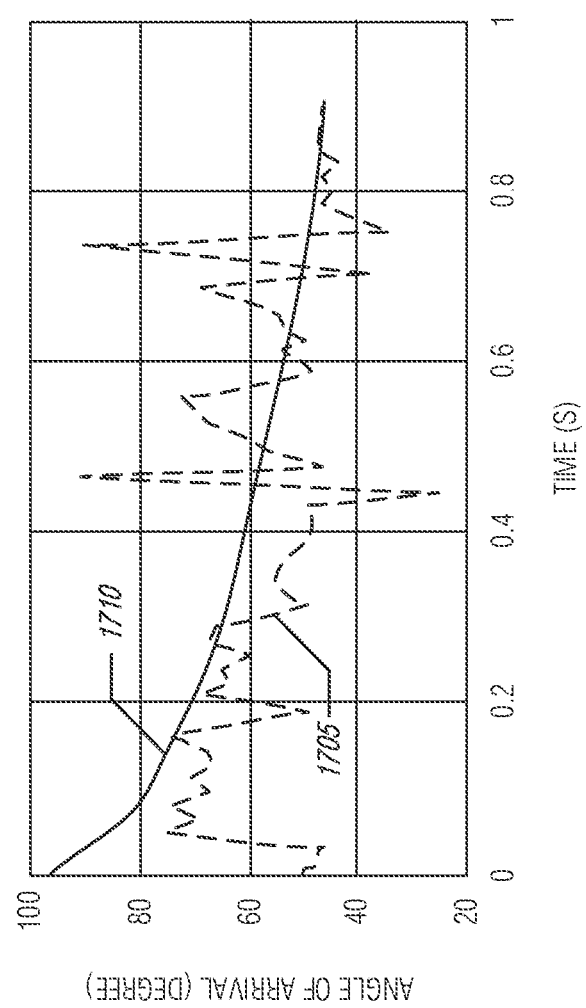
FIG. 17 illustrates an example of a graph of angle of arrival calculations before antenna separation.

FIG. 17 shows an unambiguous AoA measurement during a ball throw as indicated by the difference between the AoA ground truth measurement 1710 and the AoA measurements from the wireless anchor. The results indicate that AoA may be corrupted from spinning antenna orientation and polarization.

To mitigate the noise, the ball flight tracking engine may increase the antenna separation d. When $$d > \frac{\lambda}{2},$$

the ambiguous AoA measurements are indicated in the equations $$d\cos(\theta) = \frac{\varphi\lambda}{2\pi} + N\lambda$$

$$\cos(\theta) = \frac{\phi\lambda}{2\pi d} + N\frac{\lambda}{d}.$$

Figure 18:
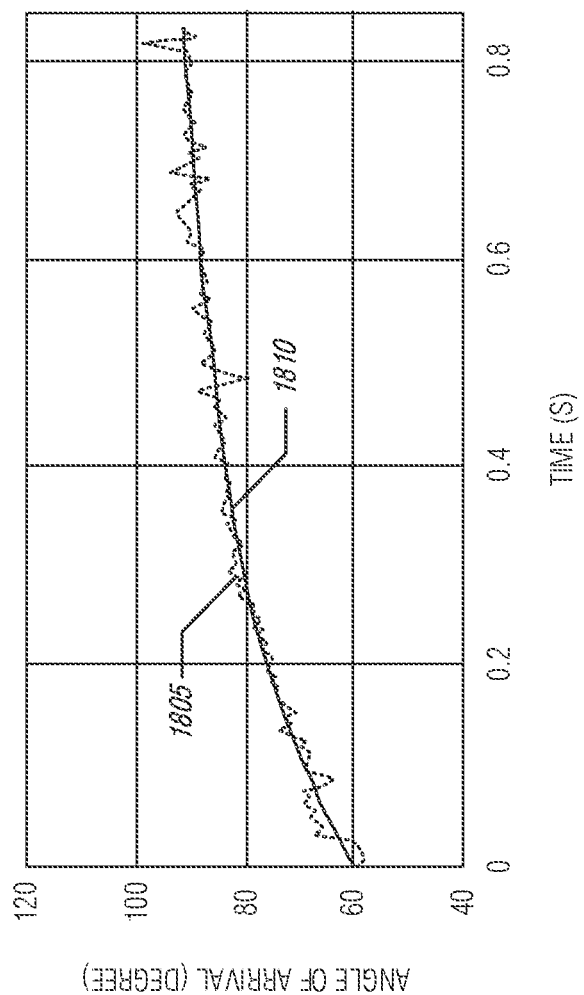
FIG. 18 illustrates an example of a graph of angle of arrival calculations using antenna separation for sensor-derived object flight performance tracking, according to an embodiment.

AoA may not only be a function of the phase difference φ, but also a function of the unknown integer ambiguity N. The smooth trajectory of the ball 105 allows the ball flight tracking engine 140 to track the integer ambiguity across measurements, thereby any wrap around may be detected and accounted for by the ball flight tracking engine 140. FIG. 18 shows AoA measurement assuming known integer ambiguity for a ball throw after increasing the antenna separation to two and one-half times the wavelength (e.g., 18 cm). The noise may be reduced as indicated by the reduced disparity between the ground truth AoA measurements 1810 and wireless anchor measurements adjusted using by calculating and assumed integer ambiguity 1805.

The ball flight tracking engine 140 calculates the integer ambiguity as follows. At any point during the gradient search algorithm, the ball flight tracking engine obtains an estimated AoA from a current set of parameters. The integer ambiguity is resolved by the ball flight tracking engine by substituting the currently estimated AoA in the equation $$\cos(\theta) = \frac{\phi\lambda}{2\pi d} + N\frac{\lambda}{d}.$$

Incorrect ambiguity resolution may be problematic for the error function due to a mismatch with range measurements. The ball flight tracking engine 140 updates the objective function Err, using the integer ambiguity resolution with AoA fusion.

$$\operatorname*{argmin}_{6params} Err =$$

$$\sum_{i=1,2}\sum_{t}\left\{R_{i,p}(t) - R_{i,m}(t) \times \frac{1}{\sqrt{(DoP)}}\right\}^2 + \sum_{t}\left\{\frac{(S_{x,p}(t) - S_{x,aoa}(t))}{R_{aoa,p}\Delta\theta}\right\}^2$$

$S_{x,aoa}(t)$ is drawn from the equation $$\cos(\theta) = \frac{S_x - x_{ia}}{R_{ia}}.$$

The $R_{aoa,p}\Delta\theta$ ($R_{aoa}$ denotes range from AoA wireless anchor, Δθ denotes AoA noise) factor decreases the weight for AoA measurements taken far away from the AoA wireless anchor. The ball flight tracking engine 140 incorporates noisy ranging and AoA measurements from the wireless anchors with physics based motion models to effectively tracking the trajectory of the ball 105.

Figure 2:
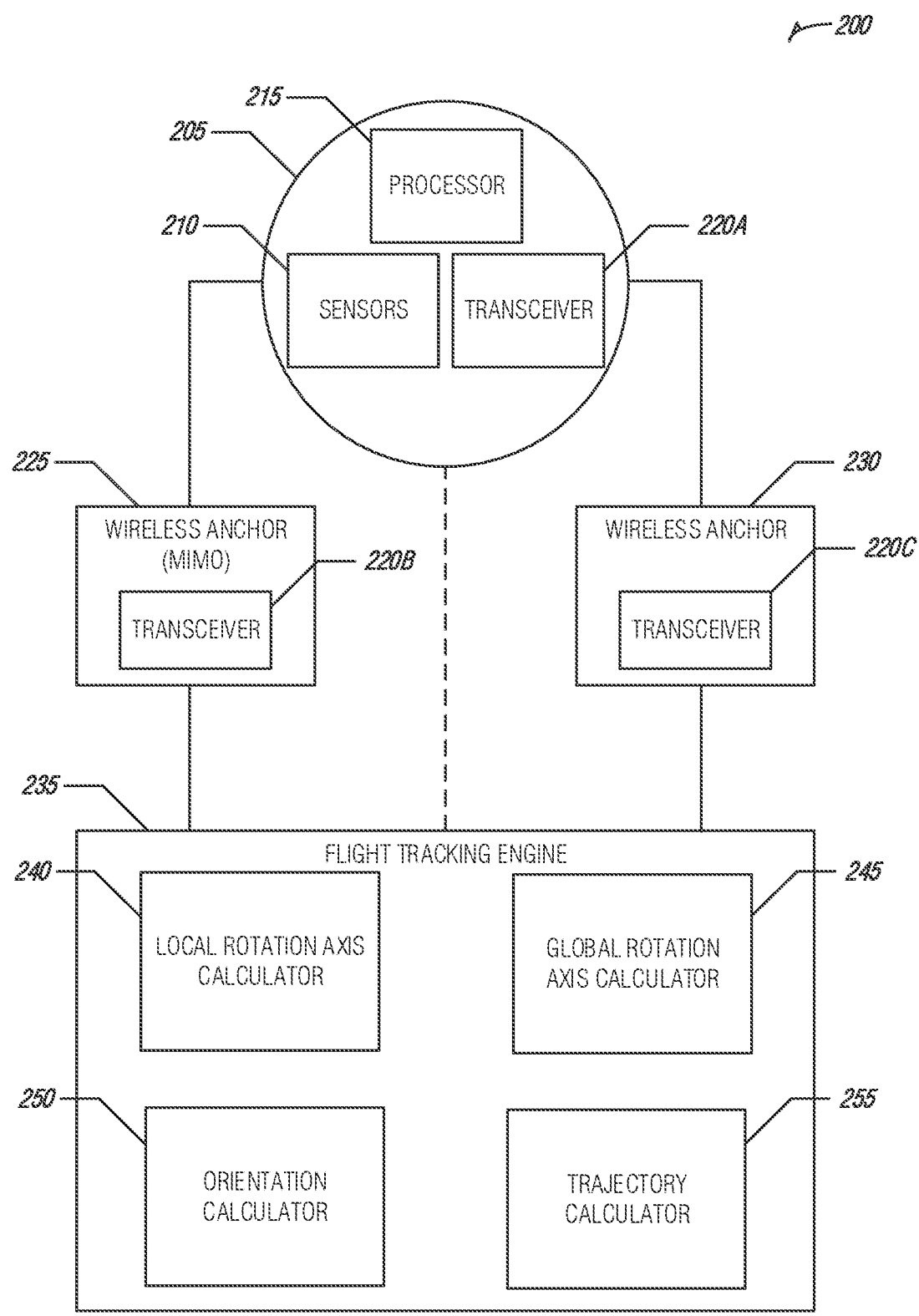
FIG. 2 is a block diagram of an example system for sensor-derived object flight performance tracking, according to an embodiment.

FIG. 2 is a block diagram of an example system 200 for sensor-derived object flight performance tracking, according to an embodiment. The system 200 may provide features as described in FIG. 1. The system 200 may include an object 205 (e.g., a cricket ball, etc.) which may include sensors 210 (e.g., an accelerometer, a magnetometer, a gyroscope, etc.), a processor 215 (e.g., a central processing unit, etc.), and a transceiver 220A (e.g., an ultra-wideband radio transmitter and receiver, etc.). The object 205 (e.g., a ball, etc.) may be communicatively coupled (e.g., via ultra-wideband radio, etc.) to wireless anchor (MIMO) 255 via transceiver 220B and wireless anchor 230 via transceiver 220C. The transceiver 255 and the transceiver 230 may be communicatively coupled to a flight tracking engine 235. The flight tracking engine 235 may include a local rotation axis calculator 240, a global rotation axis calculator 245, an orientation calculator 250, and a trajectory calculator 255.

The object 205 may be used by a player of a sport (e.g., cricket, etc.) and may be thrown (e.g., bowled, pitched, etc.) or otherwise travel through the air. As the object 205 moves, the sensors 210 may observe inertial data that may be attributed to the object 205. For example, the object 205 may be a cricket ball and a cricket bowler may spin the cricket ball and a gyroscope may observe angular velocity, an accelerometer may observe gravitational force, and a magnetometer may observe magnetic vectors. The processor 215 may work in conjunction with instructions to collect data from the sensors which may be stored in a local storage medium (e.g., flash memory, etc.) or transmitted via the transceiver 220A (e.g., to the transceiver 220B, the transceiver 220C, etc.). The processor 215 may work in conjunction with the transceiver 220A to transmit and/or receive data between the transceiver 220B and/or the transceiver 220C. In an example, a packet may be transmitted by the transceiver 220A to each of transceivers 220B and 220C for use in determining ranging information of the object 205.

The wireless anchor (MIMO) 225 may include the transceiver 220B. The wireless anchor (MIMO) 225 may be configured for multiple input multiple output (MIMO) and may include a plurality of antennas. The plurality of antennas may be used in calculating angle of arrival of the object 205 using packets transmitted between the object 205 and the wireless anchor (MIMO) 225 (e.g., using the transceiver 220A and the transceiver 220B). The wireless anchor (MIMO) 225 may be placed in the field of play of the sport in which the object 205 is used. For example, the wireless anchor (MIMO) 225 may be placed near a bowler-side wicket while a bowler bowls the cricket ball during a cricket game.

The wireless anchor 230 may include the transceiver 220C. The wireless anchor 230 may be placed in the field of play of the sport in which the object 205 is used. For example, the wireless anchor 230 may be placed near a batsman-side wicket while a bowler bowls the object 205 during a cricket game. Thus, the wireless anchor (MIMO) 225 and the wireless anchor 230 may be placed on opposing ends of an expected flight path of the object 205.

The object 205, the wireless anchor (MIMO) 225, and the wireless anchor 230 may be communicatively coupled (e.g., via wired network, wireless network, shared bus, etc.) to the flight tracking engine 235. The flight tracking engine 235 may include a variety of components such as the local rotation axis calculator 240, the global rotation axis calculator 245, the orientation calculator 250, and the trajectory calculator 255. The components may work independently and/or in conjunction to provide flight information for the object 205. The flight tacking engine 235 may provide functionality similar to the ball flight tracking engine 140 as described in FIG. 1.

The local rotation axis calculator 240 may calculate a local rotational axis for the object 205. The local rotation axis calculator 240 may obtain (e.g., via wireless anchor (MIMO) 225, wireless anchor 230, object 205) a set of magnetometer readings from a magnetometer included with the object (e.g., a magnetometer included in the sensors 210). The local rotation axis calculator 240 may perform the calculations within the object 205 using an embedded processor (e.g., processor 215, etc.) and/or outside the object 205 using an external processor. For example, the set of magnetometer readings may be transmitted over ultra-wideband radio. In an example, the set of magnetometer readings may comprise a first reading, a second reading, and a third reading from the magnetometer. The first reading may be captured at a time (e.g., a particular time during flight, etc.), the second reading may be captured immediately prior to the time, and the third reading may be captured immediately following the time. A local rotation axis (e.g., a constant axis around which the object 205 is rotating) may be determined at the time using the set of magnetometer readings. The local rotation axis may describe rotation of the object 205 around a local magnetic target (e.g., in a local coordinate frame, etc.).

In an example, a cone may be generated from a set of magnetic vectors for the set of magnetometer readings and the local rotation axis may be identified as a centerline of the cone. In an example, the cone may be fit through minimizing a variance of angle of the cone by modeling azimuth and elevation changes in a rotation axis over the set of magnetometer readings as a quadratic function of time and the local rotation axis may be adjusted to a centerline of the fitted cone.

For example, the local rotation axis calculator 240 may calculate a coarse local rotation axis using three consecutive magnetometer measurements (e.g., $N_{(t-1)}^L$, $N_{(t)}^L$, and $N_{(t+1)}^L$). To improve accuracy of the local rotation axis calculation, the local rotation axis calculator 240 may track changes in elevation and azimuth of the object 205 over time using the equations:

$$R_{(t)}^L = \begin{bmatrix} \cos(\theta_t)\cos(\varphi_t) \\ \cos(\theta_t)\sin(\varphi_t) \\ \sin(\theta_t) \end{bmatrix}$$

Elevation $\theta_t = A_{el}t^2 + B_{el}t + C_{el}$

Azimuth $\varphi_t = A_{az}t^2 + B_{az}t + C_{az}$.

The local rotation axis calculator 240 may minimize the variance of the cone angles over time by employing the equation:

$$\text{argmin Var}[\angle(R_{(T)}^L, N_{(T)}^L), \angle(R_{(T+1)}^L), (N_{(T+1)}^L), \ldots]$$

The local rotation axis may be a centerline of the cone calculated using the cone angles.

The global rotation axis calculator 245 may calculate a global rotational axis for the object 205. The global rotation axis calculator may calculate the global rotation axis based on an initial orientation of the object 205. The global rotation axis may describe a fixed rotation axis of the object 205 during flight in a global coordinate frame where an angle between the global rotation axis and magnetic north remains constant during flight. In an example, the initial orientation of the object 205 may be identified using gyroscope data collected near a release time of the object 205 from a gyroscope included with the object 205. In an example, identification of the initial orientation of the object 205 may include identification of a free fall start time of the object 205 using a set of accelerometer readings from an accelerometer included in the object 205. The gyroscope data may be collected from a time period immediately prior to the free fall start time and the initial orientation of the object 205 may be identified based on angular velocity of the gyroscope data.

For example, the global rotation axis calculator 245 may obtain the initial orientation (e.g., $R_{O(T)}$) of the object 205 from the gyroscope (e.g., included with sensors 210). The global rotation axis calculator 245 may use the initial orientation in combination with the local rotation axis (e.g., $R_{(T)}^L$) calculated by local rotation axis calculator 240 to determine the global rotation axis using the equation $R_{(T)}^G = R_{O(T)} R_{(T)}^L$ where T is the time the object 205 is released.

The orientation calculator 250 may calculate an orientation of the object 205. The orientation calculator 250 may determine the orientation of the object 205 for a time using the global rotation axis calculated by the global rotation axis calculator and the local rotation axis of the object 205 at the time.

For example, the orientation calculator 250 may calculate the orientation of the object 205 at the time by using the equation $R_{O(t)} = [R^G \ N^G \ R^G \times N^G][R_{(t)}^L \ N_{(t)}^L \ R_{(t)}^L \times N_{(t)}^L]^{-1}$ using the global rotation axis $R^G$, magnetic north $N^G$, the local rotation axis $R_{(t)}^L$, and the local magnetic vector $N_{(t)}^L$.

The trajectory calculator 255 may calculate trajectory data for the object 205. A first data packet may be received at a first wireless anchor (e.g., via transceiver 220B of wireless anchor (MIMO) 225) and a second wireless anchor (e.g., via transceiver 220C wireless anchor 230) from a wireless transceiver included with the object 205 (e.g., transceiver 220A). A second data packet may be transmitted from the first wireless anchor (e.g., via transceiver 220B of wireless anchor (MIMO) 225) and a third data packet may be transmitted from the second wireless anchor (e.g., via transceiver 220C wireless anchor 230) to the wireless transceiver included with the object 205 (e.g., transceiver 220A). A fourth data packet may be received at the first wireless anchor (e.g., via transceiver 220B of wireless anchor (MIMO) 225) and a fifth data packet may be received at the second wireless anchor (e.g., via transceiver 220C wireless anchor 230) from the wireless transceiver included with the object 205 (e.g., transceiver 220A). A first round trip time may be calculated between the first wireless anchor (e.g., wireless anchor (MIMO) 225) and the object 205 using the first data packet, the second data packet, and the fourth data packet. A second round trip time may be calculated between the second wireless anchor (e.g., wireless anchor 225) and the object 205 using the first data packet, the third data packet, and the fifth data packet. A time of flight of the object 205 may be determined using the first round trip time and the second round trip time.

The trajectory calculator 250 may determine a range for the object 205 using the first wireless anchor (e.g., wireless anchor (MIMO) 225), the second wireless anchor (e.g., wireless anchor 230), and a motion model for the object 205 in flight. A location of the object 205 for a time may be calculated using an initial position of the object 205, an initial velocity of the object 205, and the range for the object 205.

For example, the trajectory calculator 250 may denote the position of two wireless anchors as $(x_{ia}, y_{ia}, z_{ia}) \forall i \in \{1, 2\}$. The trajectory calculator 250 may denote the initial location of the object 205 as $(x_O, y_O, z_O)$ and the initial velocity of the object 205 as $(v_x, v_y, v_z)$ at the time of release (e.g., beginning of flight) of the object 205. Thus, at a given time t, the trajectory calculator 250 estimates the location of the object 205 from projectile path models without aerodynamics as: $S_{xe}(t) = x_o + v_x t$, $S_{ye}(t) = y_o + v_y t$, $S_{ze}(t) = z_o + v_z t - 0.5\ gt^2$. Where g is acceleration due to gravity. Using this formula, the range from each anchor i may be parameterized by the trajectory calculator 250 as:

$$R_{ip}(t) = \sqrt{(S_{xe} - x_{ia})^2 + (S_{ye}(t) - y_{ia})^2 + (S_{ze}(t) - z_{ia})^2}.$$

The trajectory calculator 250 may then use an error function, Err, as a difference of the parameter-modeled range and the measured range.

$$\operatorname*{argmin}_{6 params} Err = \sum_{i=1,2} \sum_{t} \{R_{i,p}(t) - R_{i,m}(t)\}^2$$

A spike in accelerometer data may be identified during the time of flight. The spike may indicate a height of the object 205. For example, the trajectory calculator 250 may determine the height of the object 205 is zero at the point of the acceleration spike because the spike is due to the impact of the object 205 with the ground. An initial release zone may be determined for the object 205. The initial release zone may be a fixed area near the release of the object. For example, the release zone may be 60 cm³ as a function of the bowler's height. For example, the cube moves higher for a taller bowler and lower for a shorter bowler. Calculating the location of the object 205 for the time may include using a gradient descent with a search area bounded by the height of the object 205 and the initial release zone. In an example, calculating the location of the object 205 for the time may include using a first distance of the object 205 from the first wireless anchor and a second distance of the object 205 from the second wireless anchor. In an example, calculating the location of the object for the time includes using an error function weighted by the first distance of the object from the first wireless anchor and the second distance of the object from the second wireless anchor.

The trajectory calculator 250 may account for dilution of precision (DoP) that may occur when ranging circles generated around each of the wireless anchors. To account for DoP, the trajectory calculator 250 may adjust the error function to reduce error as follows.

$$\operatorname*{argmin}_{6 params} Err = \sum_{i=1,2} \sum_{t} \left\{ R_{i,p}(t) - R_{i,m}(t) \times \frac{1}{\sqrt{(DoP)}} \right\}^2$$

In some examples, the first data packet may be received via a first antenna and a second antenna of the first wireless anchor. A separation distance may be determined between the first antenna and the second antenna. A phase difference may be calculated between the first antenna and the second antenna using the first data packet and the separation distance. In some examples, an angle of arrival (AoA) of the object 205 may be calculated using the phase difference, the separation distance, and an integer cycle determined by fusing the range of the object 205 and the separation distance. In an example, the location of the object 205 for the time may include using the angle of arrival.

For example, the trajectory calculator 250 may calculate the angle of arrival, θ, using the phase difference of the antennas using the equations $$d\cos(\theta)\frac{2\pi}{\lambda} = \phi \text{ and } \cos(AoA) = \cos(\theta) = \frac{\phi\lambda}{2\pi d}$$

where d is the distance between the antennas, λ is the wavelength, and φ is the phase difference. The AoA may be expressed by the trajectory calculator 250 in terms of the location of the object 205, locations of the wireless anchors, and measured ranges.

$$\cos(\theta) = \frac{S_x - x_{ia}}{R_{ia}}$$

$$S_{x,aoa} = \cos(\theta)R_{ia} + x_{ia}$$

The trajectory calculator 250 may account for integer ambiguity in measuring AoA by including an estimated AoA into the ranging calculation.

$$\operatorname*{argmin}_{6 params} Err =$$

$$\sum_{i=1,2}\sum_{t}\left\{R_{i,p}(t) - R_{i,m}(t) \times \frac{1}{\sqrt{(DoP)}}\right\}^2 + \sum_{t}\left\{\frac{(S_{x,p}(t) - S_{x,aoa}(t))}{R_{aoa,p}\Delta\theta}\right\}^2$$

In the equation, $S_{x,aoa}(t)$ is calculated using $$\cos(\theta) = \frac{S_x - x_{ia}}{R_{ia}}$$

and $R_{aoa,p}\Delta\theta$ factor decreases the weight for AoA measurements taken far away from the wireless anchor where $R_{aoa}$ denotes range from the wireless anchor and Δθ denotes AoA noise. The fusion of noisy ranging and AoA measurements using physics based motion models allows the trajectory calculator 250 to more accurately track the trajectory of the object 205.

FIG. 3 illustrates an example of rotating local axes 300 to align local directions of gravity and magnetic north with global directions for sensor-derived object flight performance tracking, according to an embodiment. Global frame 305 shows the global axes $\{X_g, Y_g, Z_g\}$ with its X axis pointing east, $Y_g$ axis pointing north, and $Z_g$ axis pointing up against gravity. Object of unknown orientation frame 310 shows an object with unknown orientation for each axis X, Y, and Z. Alignment frame 315 shows the alignment of the object to the global frame 305. The object may be rotated around the X axis until the measured gravity is along its own −Z direction. The object is rotated around the −Z axis until the measured magnetic field (e.g., compass) is along its own Y axis. The total rotation is denoted as a matrix R: [X Y Z]R=[$X_g Y_g Z_g$]. The object's orientation $R_O$ is the inverse of the rotation matrix $R^{-1}$. Thus, if the object is rotated clockwise 30° to align with the global frame 305, then its orientation is 30° counter-clockwise.

FIG. 4 illustrates an example of the movement of a ball rotating around a constant rotation axis 405 in a global framework 400 for sensor-derived object flight performance tracking, according to an embodiment. Each local axis X, Y, and Z rotates in a different cone around the constant rotation axis 405 (e.g., global rotation axis $R^G$. Magnetic north 415 is also a fixed vector $N^G$ in the global framework 400. The seam plane 410 of the ball is shown for reference.

FIG. 5 illustrates an example of the magnetic vector rotating around a local rotation axis 505 in a local framework 500 for sensor-derived object flight performance tracking, according to an embodiment. The local X, Y, and Z axes are fixed in the local framework 500. However, the magnetic vector 510 (e.g., $N^L$) rotates around a cone around the local rotation axis 405 (e.g., $R^L$). Because a magnetometer may reliably measure a single dimension of rotation, it may be possible to measure the parameters of the cone. Thus, the magnetometer may be used as a gyroscope in as the ball is in free-fall due to low-dimensional mobility.

FIG. 6 illustrates an example of a model 600 of a calculated local rotation axis 610 moving on the surface of a sphere 605 for sensor-derived object flight performance tracking, according to an embodiment. As shown, the rotation axis 610 moves in the local framework due to wobble caused by air drag during the flight of a ball. The movement of the rotation axis 610 represents the movement of a cone (e.g., $N^L$) moving on the surface of the sphere 605. The width of the cone remains unchanged as it moves along the surface of the sphere 605.

FIG. 7 illustrates an example of a graph 700 of estimation of a local rotation axis using cone fitting for sensor-derived object flight performance tracking, according to an embodiment. The graph 700 shows differences between local rotation axis (e.g., $R_{(t)}^L$) estimation using cone fitting and ground truth local rotation axis. The differences are illustrated using the estimated azimuth 715 vs the ground truth azimuth 720 and the estimated elevation 705 vs. the ground truth elevation 710. As shown, estimating the rotation axis using cone fitting generally tracks the ground truth rotation axis.

FIG. 8 illustrates an example of a diagram 800 of phases of flight of a ball thrown by a cricket bowler. During a pre-flight stage 805, the rotation of the ball may be limited in the bowler's hand allowing a gyroscope and accelerometer included with the ball to provide useable inertial data (e.g., rotational vectors, gravitational force vectors, etc.) for the ball. At a point of release 810, the accelerometer and the gyroscope may provide inertial data that may be used to determine the initial orientation of the ball and initial trajectory. Once the ball transitions to an in-flight phase 815, the accelerometer data may be less useful as the ball is in free-fall and the ball may be spinning rapidly. Thus, alternative techniques such as those disclosed herein may be used to determine orientation of the ball and trajectory of the ball during the in-flight phase 815.

FIG. 9 illustrates an example of a graph 900 of global rotation axis error in a sample set for sensor-derived object flight performance tracking, according to an embodiment. The graph 900 shows relatively low error rates in estimating a global rotation axis (e.g., $R_{(T)}^G$) using the presently presented techniques over a sample of experiments.

FIG. 10 illustrates an example of a diagram 1000 of ranging 1020 a ball 1010 along a flight path 1015 using wireless anchors 1005A and 1005B for sensor-derived object flight performance tracking, according to an embodiment. Data packets are transmitted (e.g., via ultra-wideband radio) between the ball 1010 and the wireless anchors 1005A and 1005B. Based on calculated round trip times, the range of the ball is calculated for each of the wireless anchors 1005A and 1005B. The intersection of the ranges indicate possible locations of the ball along the flight path 1010.

FIG. 11 illustrates an example of a diagram 1100 of unbalanced airflow due to asymmetric smoothness on a ball's side causing side force 1130. Diagram 1100 shows the forces acting on a ball while in flight. Besides gravitational force 1120, aerodynamic forces may be acting on the ball. The diagram 1100 shows laminar air flow 1110 over the ball and turbulent airflow 1115 under the ball as the ball travels in the direction of motion 1105. The ball's surface may be smooth on one side and rough on the other side. The disparity in surfaces may cause side force 1130. The magnitude and direction of the side force 1130 may depend on seam orientation, surface roughness, and ball velocity. The speed of the ball may cause drag force 1125. The side force 1130 and the drag force 1125 coefficients may be approximated as constants. The side force 1130 may produce up to one meter of lateral deflection in trajectory. The side force 1130, drag force 1125, and gravitational force 1120 may cause the ball motion to follow a simple projectile path.

FIG. 12 illustrates an example of a graph 1200 of ranging error when using a motion model for sensor-derived object flight performance tracking, according to an embodiment. The graph 1200 shows the extent to which a projectile model without aerodynamic forces fits the ball's true trajectory. The projectile model may be seeded with the initial location of the ball and the ball's initial velocity. The median error between the projectile model and ground truth is one centimeter across twenty-five throws of the ball offering confidence on the usability of the projectile model under controlled conditions.

FIG. 13 illustrates an example of a graph 1300 of ranging error when fusing wireless anchor ranging with a motion model for sensor-derived object flight performance tracking, according to an embodiment. The graph 1300 shows the difference between an error rate in ranging a ball using a projectile model alone 1305 and an error rate fusing the projectile model and ranging using wireless anchors 1310. As shown in graph 1300, fusing the projectile model and ranging using wireless anchors provides a reduced ranging error rate compared to the projectile model alone.

FIG. 14 illustrates an example of a diagram 1400 of dilution of precision introduced as a result of ranging errors, according to an embodiment. Diagram 1400 shows a lower dilution of precision 1405 when ranging circles from two wireless anchors ranging a ball are not tangential resulting a minimal ranging circle overlap 1410A, higher dilution of precision 1415 when ranging circles from two wireless anchors ranging a ball are externally tangential resulting a higher ranging circle overlap 1410B, and a max dilution of precision 1420 when ranging circles from two wireless anchors ranging a ball are internally tangential resulting a maximum ranging circle overlap 1410C. Dilution of precision may affect location estimation of the ball. The present subject matter accounts for dilution of precision when determining the trajectory of the ball.

FIG. 15 illustrates an example of a graph 1500 of dilution of precision aggravating error rates, according to an embodiment. The graph 1500 show error variation as a ball moves in flight. The error may increase and may be maximal near the middle of the flight ash shown by the 90 percentile line 1505, the 75 percentile line 1510, and the median line 1515. However, because dilution of precision may be modeled as a function of distance from wireless anchors, the errors may be weighted using a minimization function.

FIG. 16 illustrates an example of a diagram 1600 of measuring angle of arrival 1620 using phase differences between two antennas 1625 in a wireless anchor for sensor-derived object flight performance tracking, according to an embodiment. The phase difference 1625 may be denoted as a difference between a first phase 1605 (e.g., $p_1$) of a first antenna of a wireless anchor and a second phase 1610 (e.g., $p_2$) of a second antenna of the wireless anchor (e.g., $p_1 - p_2 \approx \phi$). The distance 1615 between the first antenna and the second antenna may be used in calculation of the angle of arrival 1620. The angle of arrival 1620 may be calculated using the equations $$d\cos(\theta)\frac{2\pi}{\lambda} = \phi \text{ and } \cos(AoA) = \cos(\theta) = \frac{\phi\lambda}{2\pi d}$$

where $\lambda$ is the wavelength.

FIG. 17 illustrates an example of a graph 1700 of angle of arrival calculations before antenna separation. The graph 1700 shows a difference between calculating angle of arrival in ranging a ball using wireless anchors without using antenna separation 1705 and ground truth angle of arrival 1710. The calculation of angle of arrival in ranging a ball using wireless anchors without using antenna separation 1705 shows unambiguous angle of arrival measurement during ball flight and indicates angle of arrival measurements corrupted by spinning antenna orientation and polarization.

FIG. 18 illustrates an example of a graph 1800 of angle of arrival calculations using antenna separation for sensor-derived object flight performance tracking, according to an embodiment. The graph 1800 shows a difference between calculating angle of arrival in ranging a ball using wireless anchors using antenna separation 1805 and ground truth angle of arrival 1810. The calculation of angle of arrival in ranging a ball using wireless anchors using antenna separation 1805 shows angle of arrival measurement assuming known integer ambiguity for a ball throw after increasing the antenna separation to 18 cm (e.g., 2.5 times wavelength) resulting in reduced noise.

Figure 19:
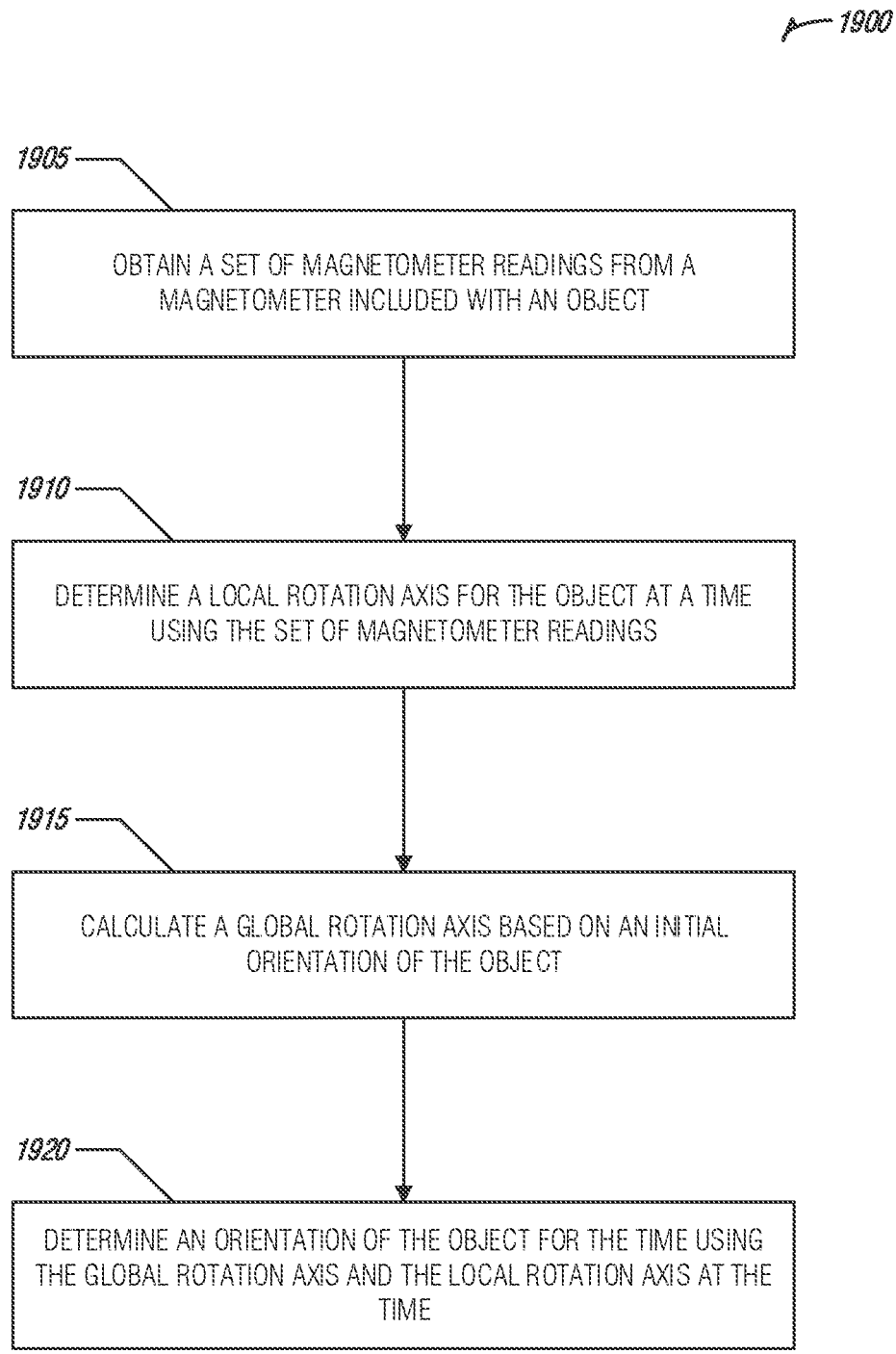
FIG. 19 is a flow diagram of an example of a method for sensor-derived object flight performance tracking, according to an embodiment.

FIG. 19 is a flow diagram of an example of a method 1900 for sensor-derived object flight performance tracking, according to an embodiment. The method 1900 may provide functionality as described in FIGS. 1 and 2.

At operation 1905, a set of magnetometer readings may be obtained from a magnetometer included with an object.

At operation 1910, a local rotation axis of the object may be determined at a time using the set of magnetometer readings. The local rotation axis may describe rotation of the object around a local magnetic target. In an example, the set of magnetometer readings may be obtained via ultra-wideband radio. In an example, the set of magnetometer readings may comprise a first reading, a second reading, and a third reading from the magnetometer, the first reading captured at the time, the second reading captured immediately prior to the time, and the third reading captured immediately following the time. In an example, determination of the local rotation axis may include generating a cone from a set of magnetic vectors for the set of magnetometer readings and the local rotation axis may be identified as a centerline of the cone. In an example, the cone may be fit through minimization of a variance of angle of the cone by modeling azimuth and elevation changes in a rotation axis over the set of magnetometer readings as a quadratic function of time and the local rotation axis may be adjusted to a centerline of the fitted cone.

At operation 1915, a global rotation axis may be calculated based on an initial orientation of the object. The global rotation axis may describe a fixed rotation axis of the object during flight in a global coordinate frame wherein an angle between the global rotation axis and magnetic north remains constant during the flight. In an example, the initial orientation of the object may be identified using gyroscope data collected near a release time of the object from a gyroscope included with the object. In an example, a free fall start time of the object may be identified using a set of accelerometer readings from an accelerometer included with the object. The gyroscope data may be collected from a time period immediately prior to the free fall start time and the orientation of the object may be identified based on angular velocity of the gyroscope data.

At operation 1920, an orientation of the object may be determined for the time using the global rotation axis and the local rotation axis of the object at the time.

Figure 20:
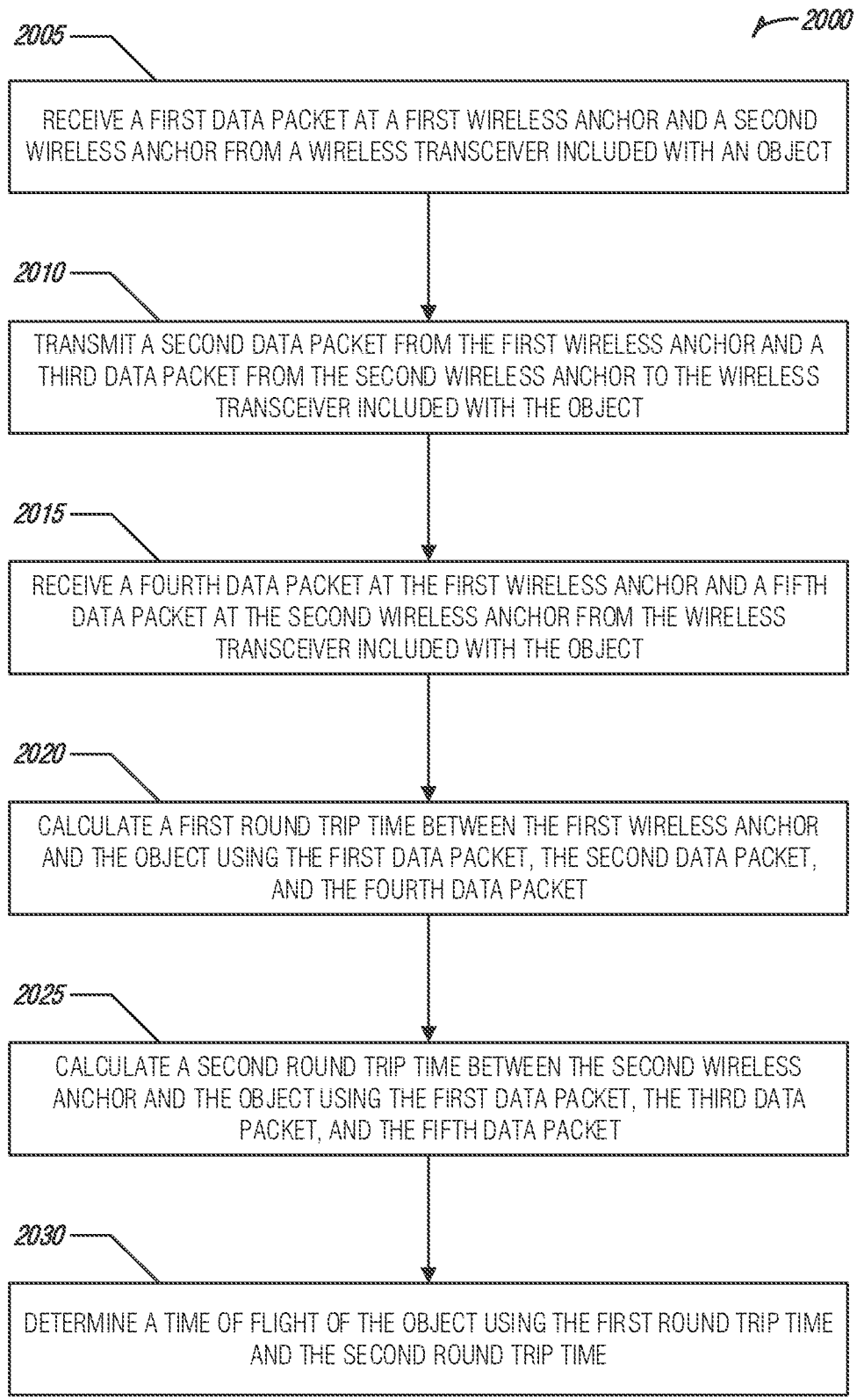
FIG. 20 is a flow diagram of an example of a method for sensor-derived object flight performance tracking, according to an embodiment.

FIG. 20 is a flow diagram of an example of a method 2000 for sensor-derived object flight performance tracking, according to an embodiment. The method 2000 may provide functionality as described in FIGS. 1 and 2.

At operation 2005, a first data packet may be received at a first wireless anchor and a second wireless anchor from a transceiver included with an object.

At operation 2010, a second data packet may be transmitted from the first wireless anchor and a third data packet may be transmitted from the second wireless anchor to the wireless transceiver included with the object.

At operation 2015, a fourth data packet may be received at the first wireless anchor and a fifth data packet may be received at the second wireless anchor from the wireless transceiver included with the object. In an example, the first data packet, the second data packet, the third data packet, the fourth data packet, and the fifth data packet may be transmitted over a wireless network. In an example, the wireless network may be an ultra-wideband (UWB) wireless network.

At operation 2020, a first round trip time between the first wireless anchor and the object may be calculated using the first data packet, the second data packet, and the fourth data packet.

At operation 2025, a second round trip time between the second wireless anchor and the object may be calculated using the first data packet, the third data packet, and the fifth data packet.

At operation 2030, a time of flight of the object may be determined using the first round trip time and the second round trip time.

In some examples, a range for the object may be determined using the first wireless anchor, the second wireless anchor, and a motion model for the object in flight. A location of the object for a time may be calculated using an initial position of the object, an initial velocity of the object, and the range for the object. In some examples, an initial release zone may be determined for the object, the initial release zone being a fixed area near the release of the object. A spike in accelerometer data may be identified during the time of flight. The spike may indicate a height of the object. The calculation of the location of the object for the time may include using a gradient descent with a search area bounded by the height of the object and the initial release zone. In some examples, the calculation of the location of the object for the time may include using a first distance of the object from the first wireless anchor and a second distance of the object from the second wireless anchor. In an example, the calculation of the location of the object for the time may include using an error function weighted by the first distance of the object from the first wireless anchor and the second wireless distance of the object from the second wireless anchor.

In some examples, the first data packet may be received via a first antenna and a second antenna of the first wireless anchor. A separation distance may be determined between the first antenna and the second antenna. A phase difference between the first antenna and the second antenna may be calculated using the first data packet and the separation distance. In some examples, an angle of arrival may be calculated using the phase difference, the separation distance, and an integer cycle determined by fusing the range for the object and the separation distance. In some examples, the calculation of the location of the object for the time may include using the angle of arrival.

Figure 21:
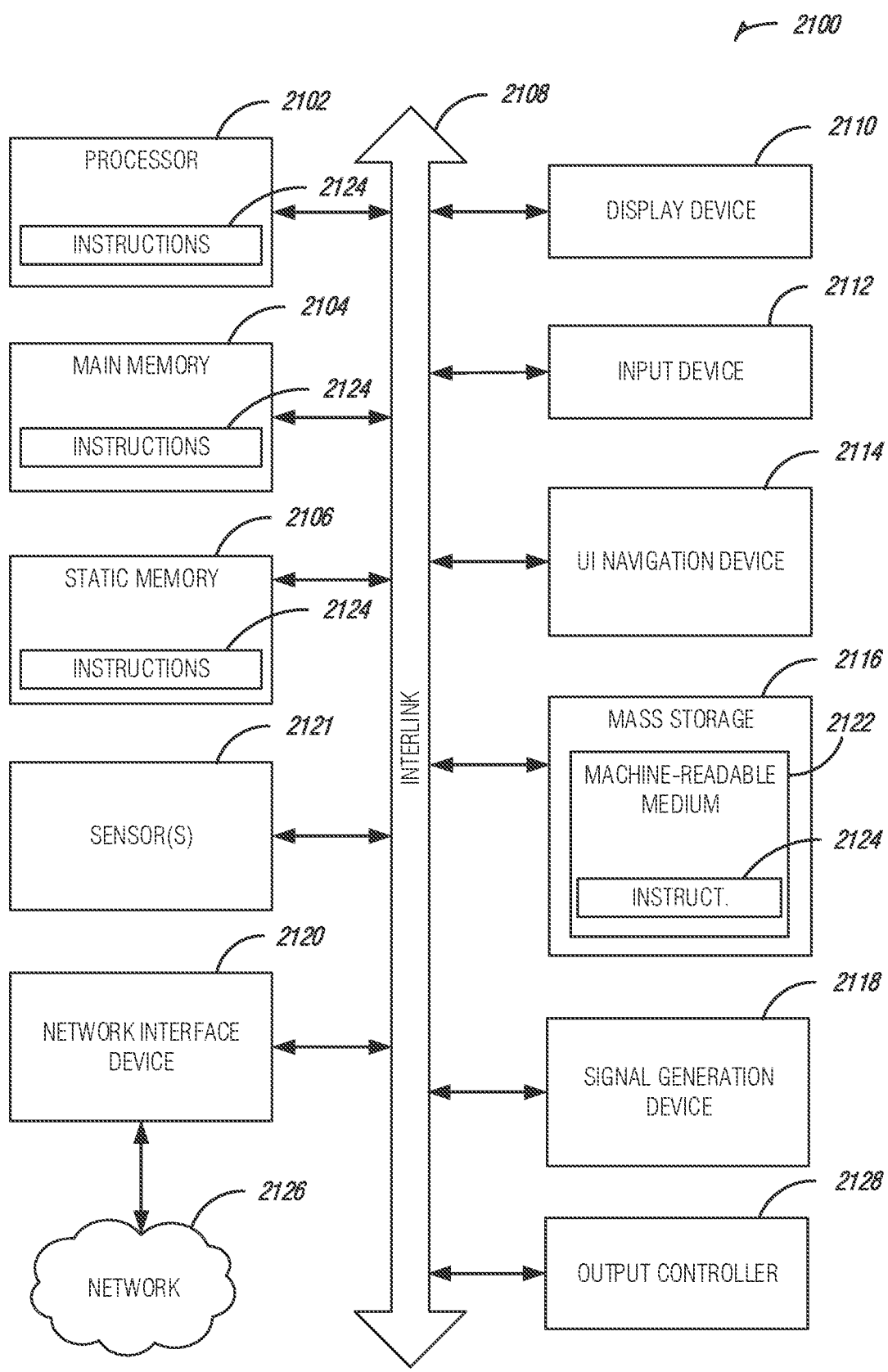
FIG. 21 is a block diagram illustrating an example of a machine upon which one or more embodiments may be implemented.

FIG. 21 illustrates a block diagram of an example machine 2100 upon which any one or more of the techniques (e.g., methodologies) discussed herein may perform. In alternative embodiments, the machine 2100 may operate as a standalone device or may be connected (e.g., networked) to other machines. In a networked deployment, the machine 2100 may operate in the capacity of a server machine, a client machine, or both in server-client network environments. In an example, the machine 2100 may act as a peer machine in peer-to-peer (P2P) (or other distributed) network environment. The machine 2100 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 2100 may include a hardware processor 2102 (e.g., a central processing unit (CPU), a graphics processing unit (GPU), a hardware processor core, or any combination thereof), a main memory 2104 and a static memory 2106, some or all of which may communicate with each other via an interlink (e.g., bus) 2108. The machine 2100 may further include a display unit 2110, an alphanumeric input device 2112 (e.g., a keyboard), and a user interface (UI) navigation device 2114 (e.g., a mouse). In an example, the display unit 2110, input device 2112 and UI navigation device 2114 may be a touch screen display. The machine 2100 may additionally include a storage device (e.g., drive unit) 2116, a signal generation device 2118 (e.g., a speaker), a network interface device 2120, and one or more sensors 2121, such as a global positioning system (GPS) sensor, compass, accelerometer, or other sensor. The machine 2100 may include an output controller 2128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2116 may include a machine readable medium 2122 on which is stored one or more sets of data structures or instructions 2124 (e.g., software) embodying or utilized by any one or more of the techniques or functions described herein. The instructions 2124 may also reside, completely or at least partially, within the main memory 2104, within static memory 2106, or within the hardware processor 2102 during execution thereof by the machine 2100. In an example, one or any combination of the hardware processor 2102, the main memory 2104, the static memory 2106, or the storage device 2116 may constitute machine readable media.

While the machine readable medium 2122 is illustrated as a single medium, the term "machine readable medium" may include a single medium or multiple media (e.g., a centralized or distributed database, and/or associated caches and servers) configured to store the one or more instructions 2124.

The term "machine readable medium" may include any medium that is capable of storing, encoding, or carrying instructions for execution by the machine 2100 and that cause the machine 2100 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2124 may further be transmitted or received over a communications network 2126 using a transmission medium via the network interface device 2120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 2120 may include one or more physical jacks (e.g., Ethernet, coaxial, or phone jacks) or one or more antennas to connect to the communications network 2126. In an example, the network interface device 2120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 2100, and includes digital or analog communications signals or other intangible medium to facilitate communication of such software.

Additional Notes & Examples

Example 1 is a system for determining spin of an object for a time, the system comprising: at least one processor; and a memory including instructions that, when executed by the at least one processor, configure the at least one processor to perform operations to: obtain a set of magnetometer readings from a magnetometer included with the object; determine a local rotation axis of the object at the time using the set of magnetometer readings, the local rotation axis describing rotation of the object around a local magnetic target; calculate a global rotation axis based on an initial orientation of the object, the global rotation axis describing a fixed rotation axis of the object during flight in a global coordinate frame, wherein an angle between the global rotation axis and magnetic north remains constant during the flight; and determine an orientation of the object for the time using the global rotation axis and the local rotation axis of the object at the time.

In Example 2, the subject matter of Example 1 optionally includes wherein the instructions to determine the local rotation axis further include instructions to generate a cone from a set of magnetic vectors for the set of magnetometer readings, wherein the local rotation axis is identified as a centerline of the cone.

In Example 3, the subject matter of Example 2 optionally includes instructions to: fit the cone through minimization a variance of angle of the cone by modeling azimuth and elevation changes in a rotation axis over the set of magnetometer readings as a quadratic function of time; and adjust the local rotation axis to a centerline of the fitted cone.

In Example 4, the subject matter of any one or more of Examples 1-3 optionally include instructions to: identify the initial orientation of the object using gyroscope data collected near release time of the object from a gyroscope included with the object.

In Example 5, the subject matter of Example 4 optionally includes wherein the instructions to identify the initial orientation of the object at the release time further comprises instructions to: identify a free fall start time of the object using a set of accelerometer readings from an accelerometer included with the object; collect the gyroscope data from a time period immediately prior to the free fall start time; and identify the initial orientation of the object based on angular velocity of the gyroscope data.

In Example 6, the subject matter of any one or more of Examples 1-5 optionally include wherein the set of magnetometer readings comprises a first reading, a second reading, and a third reading from the magnetometer, the first reading captured at the time, the second reading captured immediately prior to the time, and the third reading captured immediately following the time.

In Example 7, the subject matter of any one or more of Examples 1-6 optionally include wherein the set of magnetometer measurements are obtained via wireless radio link.

In Example 8, the subject matter of any one or more of Examples 1-7 optionally include wherein the set of magnetometer measurements are obtained via processing circuitry included with the object.

Example 9 is at least one machine readable medium including instructions for determining spin of an object for a time that, when executed by a machine, cause the machine to perform operations to: obtain a set of magnetometer readings from a magnetometer included with the object; determine a local rotation axis of the object at the time using the set of magnetometer readings, the local rotation axis describing rotation of the object around a local magnetic target; calculate a global rotation axis based on an initial orientation of the object, the global rotation axis describing a fixed rotation axis of the object during flight in a global coordinate frame, wherein an angle between the global rotation axis and magnetic north remains constant during the flight; and determine an orientation of the object for the time using the global rotation axis and the local rotation axis of the object at the time.

In Example 10, the subject matter of Example 9 optionally includes wherein the instructions to determine the local rotation axis further include instructions to generate a cone from a set of magnetic vectors for the set of magnetometer readings, wherein the local rotation axis is identified as a centerline of the cone.

In Example 11, the subject matter of Example 10 optionally includes instructions to: fit the cone through minimization a variance of angle of the cone by modeling azimuth and elevation changes in a rotation axis over the set of magnetometer readings as a quadratic function of time; and adjust the local rotation axis to a centerline of the fitted cone.

In Example 12, the subject matter of any one or more of Examples 9-11 optionally include instructions to: identify the initial orientation of the object using gyroscope data collected near release time of the object from a gyroscope included with the object.

In Example 13, the subject matter of Example 12 optionally includes wherein the instructions to identify the initial orientation of the object further comprises instructions to: identify a free fall start time of the object using a set of accelerometer readings from an accelerometer included with the object; collect the gyroscope data from a time period immediately prior to the free fall start time; and identify the initial orientation of the object based on angular velocity of the gyroscope data.

In Example 14, the subject matter of any one or more of Examples 9-13 optionally include wherein the set of magnetometer readings comprises a first reading, a second reading, and a third reading from the magnetometer, the first reading captured at the time, the second reading captured immediately prior to the time, and the third reading captured immediately following the time.

In Example 15, the subject matter of any one or more of Examples 9-14 optionally include wherein the set of magnetometer measurements are obtained via wireless radio link.

In Example 16, the subject matter of any one or more of Examples 9-15 optionally include wherein the set of magnetometer measurements are obtained via processing circuitry included with the object.

Example 17 is an apparatus for spin determination for a time, the apparatus comprising: a sensor array; a transceiver; at least one processor; and a memory including instructions that, when executed by the at least one processor, cause the at least one processor to: obtain a set of magnetometer readings from a magnetometer included with the sensor array; determine a local rotation axis at the time using the set of magnetometer readings, the local rotation axis describing rotation around a local magnetic target; calculate a global rotation axis based on an initial orientation, the global rotation axis describing a fixed rotation axis during flight in a global coordinate frame, wherein an angle between the global rotation axis and magnetic north remains constant during the flight; and determine an orientation for the time using the global rotation axis and the local rotation axis of the object at the time.

In Example 18, the subject matter of Example 17 optionally includes wherein the instructions to determine the local rotation axis further include instructions to generate a cone from a set of magnetic vectors for the set of magnetometer readings, wherein the local rotation axis is identified as a centerline of the cone.

In Example 19, the subject matter of Example 18 optionally includes instructions to: fit the cone through minimization a variance of angle of the cone by modeling azimuth and elevation changes in a rotation axis over the set of magnetometer readings as a quadratic function of time; and adjust the local rotation axis to a centerline of the fitted cone.

In Example 20, the subject matter of any one or more of Examples 17-19 optionally include instructions to: identify the initial orientation using gyroscope data collected near release time of the object from a gyroscope included with the sensor array.

In Example 21, the subject matter of Example 20 optionally includes wherein the instructions to identify the initial orientation further comprises instructions to: identify a free fall start time using a set of accelerometer readings from an accelerometer included with the sensor array; collect the gyroscope data from a time period immediately prior to the free fall start time; and identify the initial orientation based on angular velocity of the gyroscope data.

In Example 22, the subject matter of any one or more of Examples 17-21 optionally include wherein the set of magnetometer readings comprises a first reading, a second reading, and a third reading from the magnetometer, the first reading captured at the time, the second reading captured immediately prior to the time, and the third reading captured immediately following the time.

Example 23 is a method for determining spin of an object for a time, the method comprising: obtaining a set of magnetometer readings from a magnetometer included with the object; determining a local rotation axis of the object at the time using the set of magnetometer readings, the local rotation axis describing rotation of the object around a local magnetic target; calculating a global rotation axis based on an initial orientation of the object, the global rotation axis describing a fixed rotation axis of the object during flight in a global coordinate frame, wherein an angle between the global rotation axis and magnetic north remains constant during the flight; and determining an orientation of the object for the time using the global rotation axis and the local rotation axis of the object at the time.

In Example 24, the subject matter of Example 23 optionally includes wherein determining the local rotation axis further includes generating a cone from a set of magnetic vectors for the set of magnetometer readings, wherein the local rotation axis is identified as a centerline of the cone.

In Example 25, the subject matter of Example 24 optionally includes fitting the cone through minimizing a variance of angle of the cone by modeling azimuth and elevation changes in a rotation axis over the set of magnetometer readings as a quadratic function of time; and adjusting the local rotation axis to a centerline of the fitted cone.

In Example 26, the subject matter of any one or more of Examples 23-25 optionally include identifying the initial orientation of the object using gyroscope data collected near a release time of the object from a gyroscope included with the object.

In Example 27, the subject matter of Example 26 optionally includes wherein identifying the initial orientation of the object further comprises: identifying a free fall start time of the object using a set of accelerometer readings from an accelerometer included with the object; collecting the gyroscope data from a time period immediately prior to the free fall start time; and identifying the initial orientation of the object based on angular velocity of the gyroscope data.

In Example 28, the subject matter of any one or more of Examples 23-27 optionally include wherein the set of magnetometer readings comprises a first reading, a second reading, and a third reading from the magnetometer, the first reading captured at the time, the second reading captured immediately prior to the time, and the third reading captured immediately following the time.

In Example 29, the subject matter of any one or more of Examples 23-28 optionally include wherein the set of magnetometer measurements are obtained via wireless radio link.

In Example 30, the subject matter of any one or more of Examples 23-29 optionally include wherein the set of magnetometer measurements are obtained via processing circuitry included with the object.

Example 31 is a system to implement determining spin of an object for a time, the system comprising means to perform any method of Examples 23-30.

Example 32 is at least one machine readable medium to implement determining spin of an object for a time, the at least one machine readable medium including instructions that, when executed by a machine, cause the machine to perform any method of Examples 23-30.

Example 33 is a system for determining spin of an object for a time, the system comprising: means for obtaining a set of magnetometer readings from a magnetometer included with the object; means for determining a local rotation axis of the object at the time using the set of magnetometer readings, the local rotation axis describing rotation of the object around a local magnetic target; means for calculating a global rotation axis based on an initial orientation of the object, the global rotation axis describing a fixed rotation axis of the object during flight in a global coordinate frame, wherein an angle between the global rotation axis and magnetic north remains constant during the flight; and means for determining an orientation of the object for the time using the global rotation axis and the local rotation axis of the object at the time.

In Example 34, the subject matter of Example 33 optionally includes wherein the means for determining the local rotation axis further includes means for generating a cone from a set of magnetic vectors for the set of magnetometer readings, wherein the local rotation axis is identified as a centerline of the cone.

In Example 35, the subject matter of Example 34 optionally includes means for minimizing the cone by modeling azimuth and elevation changes in a rotation axis over the set of magnetometer readings as a quadratic function of time; and means for adjusting the local rotation angle to a centerline of the minimized cone.

In Example 36, the subject matter of any one or more of Examples 33-35 optionally include means for identifying the initial orientation of the object using gyroscope data collected near a release time of the object from a gyroscope included with the object.

In Example 37, the subject matter of Example 36 optionally includes wherein the means for identifying the orientation of the object at the release time further comprises: means for identifying a free fall start time of the object using a set of accelerometer readings from an accelerometer included with the object; means for collecting the gyroscope data from a time period immediately prior to the free fall start time; and means for identifying the orientation of the object based on angular velocity of the gyroscope data.

In Example 38, the subject matter of any one or more of Examples 33-37 optionally include wherein the set of magnetometer readings comprises a first reading, a second reading, and a third reading from the magnetometer, the first reading captured at the time, the second reading captured immediately prior to the time, and the third reading captured immediately following the time.

In Example 39, the subject matter of any one or more of Examples 33-38 optionally include wherein the set of magnetometer measurements are obtained via wireless radio link.

In Example 40, the subject matter of any one or more of Examples 33-39 optionally include wherein the set of magnetometer measurements are obtained via processing circuitry included with the object.

Example 41 is a system for determining the trajectory of an object, the system comprising: a first wireless anchor; a second wireless anchor; at least one processor; and a memory including instructions that, when executed by the at least one processor, cause the at least one processor to perform operations to: receive, over a wireless network, a first data packet at the first wireless anchor and the second wireless anchor from a wireless transceiver included with the object; transmit, over the wireless network, a second data packet from the first wireless anchor and a third data packet from the second wireless anchor to the wireless transceiver included with the object; receive, over the wireless network, a fourth data packet at the first wireless anchor and a fifth data packet at the second wireless anchor from the wireless transceiver included with the object; calculate a first round trip time between the first wireless anchor and the object using the first data packet, the second data packet, and the fourth data packet; calculate a second round trip time between the second wireless anchor and the object using the first data packet, the third data packet, and the fifth data packet; and determine a time of flight of the object using the first round trip time and the second round trip time.

In Example 42, the subject matter of Example 41 optionally includes instructions to: determine a range for the object using the first wireless anchor, the second wireless anchor, and a motion model for the object in flight; and calculate a location of the object for a time using an initial position of the object, an initial velocity of the object, and the range for the object.

In Example 43, the subject matter of Example 42 optionally includes instructions to: determine an initial release zone for the object, the initial release zone being a fixed area near the release of the object; identify a spike in accelerometer data during the time of flight, the spike indicative of a height of the object; and wherein the instructions to calculate the location of the object for the time include instructions to use a gradient descent with a search area bounded by the height of the object and the initial release zone.

In Example 44, the subject matter of Example 43 optionally includes wherein the instructions to calculate the location of the object for the time include instructions to use a first distance of the object from the first wireless anchor and a second distance of the object from the second wireless anchor.

In Example 45, the subject matter of Example 44 optionally includes wherein the instructions to calculate the location of the object for the time include instructions to use an error function weighted by the first distance of the object from the first wireless anchor and the second distance of the object from the second wireless anchor.

In Example 46, the subject matter of any one or more of Examples 43-45 optionally include instructions to: receive the first data packet via a first antenna and a second antenna of the first wireless anchor; determine a separation distance between the first antenna and the second antenna; and calculate a phase difference between the first antenna and the second antenna using the first data packet and the separation distance.

In Example 47, the subject matter of Example 46 optionally includes instructions to: calculate an angle of arrival using the phase difference, the separation distance, and an integer cycle determined by fusing the range for the object and the separation distance.

In Example 48, the subject matter of Example 47 optionally includes wherein the instructions to calculate the location of the object for the time include instructions to use the angle of arrival.

In Example 49, the subject matter of any one or more of Examples 41-48 optionally include wherein the wireless network is an ultra-wideband wireless network.

Example 50 is at least one machine readable medium including instructions for determining the trajectory of an object that, when executed by a machine, cause the machine to perform operations to: receive, over a wireless network, a first data packet at the first wireless anchor and the second wireless anchor from a wireless transceiver included with the object; transmit, over the wireless network, a second data packet from the first wireless anchor and a third data packet from the second wireless anchor to the wireless transceiver included with the object; receive, over the wireless network, a fourth data packet at the first wireless anchor and a fifth data packet at the second wireless anchor from the wireless transceiver included with the object; calculate a first round trip time between the first wireless anchor and the object using the first data packet, the second data packet, and the fourth data packet; calculate a second round trip time between the second wireless anchor and the object using the first data packet, the third data packet, and the fifth data packet; and determine a time of flight of the object using the first round trip time and the second round trip time.

In Example 51, the subject matter of Example 50 optionally includes instructions to: determine a range for the object using the first wireless anchor, the second wireless anchor, and a motion model for the object in flight; and calculate a location of the object for a time using an initial position of the object, an initial velocity of the object, and the range for the object.

In Example 52, the subject matter of Example 51 optionally includes instructions to: determine an initial release zone for the object, the initial release zone being a fixed area near the release of the object; identify a spike in accelerometer data during the time of flight, the spike indicative of a height of the object; and wherein the instructions to calculate the location of the object for the time include instructions to use a gradient descent with a search area bounded by the height of the object and the initial release zone.

In Example 53, the subject matter of Example 52 optionally includes wherein the instructions to calculate the location of the object for the time include instructions to use a first distance of the object from the first wireless anchor and a second distance of the object from the second wireless anchor.

In Example 54, the subject matter of Example 53 optionally includes wherein the instructions to calculate the location of the object for the time include instructions to use an error function weighted by the first distance of the object from the first wireless anchor and the second distance of the object from the second wireless anchor.

In Example 55, the subject matter of any one or more of Examples 52-54 optionally include instructions to: receive the first data packet via a first antenna and a second antenna of the first wireless anchor; determine a separation distance between the first antenna and the second antenna; and calculate a phase difference between the first antenna and the second antenna using the first data packet and the separation distance.

In Example 56, the subject matter of Example 55 optionally includes instructions to: calculate an angle of arrival using the phase difference, the separation distance, and an integer cycle determined by fusing the range for the object and the separation distance.

In Example 57, the subject matter of Example 56 optionally includes wherein the instructions to calculate the location of the object for the time include instructions to use the angle of arrival.

In Example 58, the subject matter of any one or more of Examples 50-57 optionally include wherein the wireless network is an ultra-wideband wireless network.

Example 59 is a method for determining the trajectory of an object, the method comprising: receiving, over a wireless network, a first data packet at a first wireless anchor and a second wireless anchor from a wireless transceiver included with the object; transmitting, over the wireless network, a second data packet from the first wireless anchor and a third data packet from the second wireless anchor to the wireless transceiver included with the object; receiving, over the wireless network, a fourth data packet at the first wireless anchor and a fifth data packet at the second wireless anchor from the wireless transceiver included with the object;

calculating a first round trip time between the first wireless anchor and the object using the first data packet, the second data packet, and the fourth data packet; calculating a second round trip time between the second wireless anchor and the object using the first data packet, the third data packet, and the fifth data packet; and determining a time of flight of the object using the first round trip time and the second round trip time.

In Example 60, the subject matter of Example 59 optionally includes determining a range for the object using the first wireless anchor, the second wireless anchor, and a motion model for the object in flight; and calculating a location of the object for a time using an initial position of the object, an initial velocity of the object, and the range for the object.

In Example 61, the subject matter of Example 60 optionally includes determining an initial release zone for the object, the initial release zone being a fixed area near the release of the object; identifying a spike in accelerometer data during the time of flight, the spike indicating a height of the object; and wherein calculating the location of the object for the time includes using a gradient descent with a search area bounded by the height of the object and the initial release zone.

In Example 62, the subject matter of Example 61 optionally includes wherein calculating the location of the object for the time includes using a first distance of the object from the first wireless anchor and a second distance of the object from the second wireless anchor.

In Example 63, the subject matter of Example 62 optionally includes wherein calculating the location of the object for the time includes using an error function weighted by the first distance of the object from the first wireless anchor and the second distance of the object from the second wireless anchor.

In Example 64, the subject matter of any one or more of Examples 61-63 optionally include receiving the first data packet via a first antenna and a second antenna of the first wireless anchor; determining a separation distance between the first antenna and the second antenna; and calculating a phase difference between the first antenna and the second antenna using the first data packet and the separation distance.

In Example 65, the subject matter of Example 64 optionally includes calculating an angle of arrival using the phase difference, the separation distance, and an integer cycle determined by fusing the range for the object and the separation distance.

In Example 66, the subject matter of Example 65 optionally includes wherein calculating the location of the object for the time includes using the angle of arrival.

In Example 67, the subject matter of any one or more of Examples 59-66 optionally include wherein the wireless network is an ultra-wideband wireless network.

Example 68 is a system to implement determining the trajectory of an object, the system comprising means to perform any method of Examples 59-67.

Example 69 is at least one machine readable medium to implement determining the trajectory of an object, the at least one machine readable medium including instructions that, when executed by a machine, cause the machine to perform any method of Examples 59-67.

Example 70 is a system for determining the trajectory of an object, the system comprising: means for receiving, over a wireless network, a first data packet at a first wireless anchor and a second wireless anchor from a wireless transceiver included with the object; means for transmitting, over the wireless network, a second data packet from the first wireless anchor and a third data packet from the second wireless anchor to the wireless transceiver included with the object; means for receiving, over the wireless network, a fourth data packet at the first wireless anchor and a fifth data packet at the second wireless anchor from the wireless transceiver included with the object; means for calculating a first round trip time between the first wireless anchor and the object using the first data packet, the second data packet, and the fourth data packet; means for calculating a second round trip time between the second wireless anchor and the object using the first data packet, the third data packet, and the fifth data packet; and means for determining a time of flight of the object using the first round trip time and the second round trip time.

In Example 71, the subject matter of Example 70 optionally includes means for determining a range for the object using the first wireless anchor, the second wireless anchor, and a motion model for the object in flight; and means for calculating a location of the object for a time using an initial position of the object, an initial velocity of the object, and the range for the object.

In Example 72, the subject matter of Example 71 optionally includes means for determining an initial release zone for the object, the initial release zone being a fixed area near the release of the object; means for identifying a spike in accelerometer data during the time of flight, the spike indicating a height of the object; and wherein the means for calculating the location of the object for the time include means for using a gradient descent with a search area bounded by the height of the object and the initial release zone.

In Example 73, the subject matter of Example 72 optionally includes wherein the means for calculating the location of the object for the time include means for using a first distance of the object from the first wireless anchor and a second distance of the object from the second wireless anchor.

In Example 74, the subject matter of Example 73 optionally includes wherein means for calculating the location of the object for the time include means for using an error function weighted by the first distance of the object from the first wireless anchor and the second distance of the object from the second wireless anchor.

In Example 75, the subject matter of any one or more of Examples 72-74 optionally include means for receiving the first data packet via a first antenna and a second antenna of the first wireless anchor; means for determining a separation distance between the first antenna and the second antenna; and means for calculating a phase difference between the first antenna and the second antenna using the first data packet and the separation distance.

In Example 76, the subject matter of Example 75 optionally includes means for calculating an angle of arrival using the phase difference, the separation distance, and an integer cycle determined by fusing the range for the object and the separation distance.

In Example 77, the subject matter of Example 76 optionally includes wherein the means for calculating the location of the object for the time include means for using the angle of arrival.

In Example 78, the subject matter of any one or more of Examples 70-77 optionally include wherein the wireless network is an ultra-wideband wireless network.

Example 79 is at least one machine-readable medium including instructions, which when executed by a machine, cause the machine to perform operations of any of the operations of Examples 1-78.

Example 80 is an apparatus comprising means for performing any of the operations of Examples 1-78.

Example 81 is a system to perform the operations of any of the Examples 1-78.

Example 82 is a method to perform the operations of any of the Examples 1-78.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method for determining spin of a thrown object for a time along a flight path of the thrown object, the method comprising:
    obtaining a set of magnetometer readings from a magnetometer included with the thrown object;
    determining a local rotation axis of the thrown object at the time using the set of magnetometer readings, an approximated side force on the thrown object, and an approximated air drag force on the thrown object, the local rotation axis describing rotation of the thrown object around a local magnetic target included with the thrown object;
    calculating a global rotation axis by translating the local rotation axis to a global coordinate frame based on an initial orientation of the thrown object, gravity, and magnetic north in the global coordinate frame; and
    determining an orientation of the thrown object for the time using the global rotation axis and the local rotation axis of the thrown object at the time.

2. The method of claim 1, wherein determining the local rotation axis further includes generating a cone from a set of magnetic vectors for the set of magnetometer readings, wherein the local rotation axis is identified as a centerline of the cone.

3. The method of claim 2, further comprising:
    fitting the cone through minimizing a variance of angle of the cone by modeling azimuth and elevation changes in a rotation axis over the set of magnetometer readings as a quadratic function of time; and
    adjusting the local rotation axis to a centerline of the fitted cone.

4. The method of claim 1, further comprising:
    identifying the initial orientation of the thrown object using gyroscope data collected during launch of the thrown object from a gyroscope included with the thrown object.

5. The method of claim 4, wherein identifying the initial orientation of the thrown object further comprises:
    identifying a free fall start time of the thrown object using a set of accelerometer readings from an accelerometer included with the thrown object;
    collecting the gyroscope data from a time period immediately prior to the free fall start time; and
    identifying the initial orientation of the thrown object based on angular velocity of the gyroscope data.

6. The method of claim 1, wherein the set of magnetometer readings comprises a first reading, a second reading, and a third reading from the magnetometer, the first reading captured at the time, the second reading captured immediately prior to the time, and the third reading captured immediately following the time.

7. The method of claim 1, wherein the set of magnetometer readings are obtained via wireless radio link.

8. A system for determining spin of a thrown object for a time along a flight path of the thrown object, the system comprising:
    at least one processor; and
    memory including instructions that, when executed by the at least one processor, cause the at least one processor to perform operations to:
        determine a local rotation axis of the thrown object at the time using a set of magnetometer readings from the thrown object, an approximated side force on the thrown object, and an approximated air drag force on the thrown object, the local rotation axis describing rotation of the thrown object around a local magnetic target of the thrown object;

calculate a global rotation axis by translating the local rotation axis to a global coordinate frame based on an initial orientation of the thrown object, gravity, and magnetic north in the global coordinate frame; and determine an orientation of the thrown object for the time using the global rotation axis and the local rotation axis of the thrown object at the time.

9. The system of claim 8, wherein the instructions to determine the local rotation axis further includes instructions to generate a cone from a set of magnetic vectors for the set of magnetometer readings, wherein the local rotation axis is identified as a centerline of the cone.

10. The system of claim 9, the memory further comprising instructions that, when executed by the at least one processor, cause the at least one processor to perform operations to:

fit the cone through minimizing a variance of angle of the cone by modeling azimuth and elevation changes in a rotation axis over the set of magnetometer readings as a quadratic function of time; and adjust the local rotation axis to a centerline of the fitted cone.

11. The system of claim 8, the memory further comprising instructions that, when executed by the at least one processor, cause the at least one processor to perform operations to:

identify the initial orientation of the thrown object using gyroscope data collected during launch of the thrown object from a gyroscope included with the thrown object.

12. The system of claim 11, wherein the instructions to identify the initial orientation of the thrown object further include instructions to:

identify a free fall start time of the thrown object using a set of accelerometer readings from an accelerometer included with the thrown object;

collect the gyroscope data from a time period immediately prior to the free fall start time; and identify the initial orientation of the thrown object based on angular velocity of the gyroscope data.

13. The system of claim 8, wherein the set of magnetometer readings comprises a first reading, a second reading, and a third reading from the magnetometer, the first reading captured at the time, the second reading captured immediately prior to the time, and the third reading captured immediately following the time.

14. The system of claim 8, wherein the set of magnetometer readings are obtained via wireless radio link.

15. At least one non-transitory machine-readable medium including instructions for determining spin of a thrown object for a time along a flight path of the thrown object that, when executed by at least one processor, cause the at least one processor to perform operations to:

determine a local rotation axis of the thrown object at the time using a set of magnetometer readings from the thrown object, an approximated side force on the thrown object, and an approximated air drag force on the thrown object, the local rotation axis describing rotation of the thrown object around a local magnetic target of the thrown object;

calculate a global rotation axis by translating the local rotation axis to a global coordinate frame based on an initial orientation of the thrown object, gravity, and magnetic north in the global coordinate frame; and determine an orientation of the thrown object for the time using the global rotation axis and the local rotation axis of the thrown object at the time.

16. The at least one non-transitory machine-readable medium of claim 15, wherein the instructions to determine the local rotation axis further includes instructions to generate a cone from a set of magnetic vectors for the set of magnetometer readings, wherein the local rotation axis is identified as a centerline of the cone.

17. The at least one non-transitory machine-readable medium of claim 16, further comprising instructions that, when executed by the at least one processor, cause the at least one processor to perform operations to:

fit the cone through minimizing a variance of angle of the cone by modeling azimuth and elevation changes in a rotation axis over the set of magnetometer readings as a quadratic function of time; and adjust the local rotation axis to a centerline of the fitted cone.

18. The at least one non-transitory machine-readable medium of claim 15, further comprising instructions that, when executed by the at least one processor, cause the at least one processor to perform operations to:

identify the initial orientation of the thrown object using gyroscope data collected during launch of the thrown object from a gyroscope included with the thrown object.

19. The at least one non-transitory machine-readable medium of claim 18, wherein the instructions to identify the initial orientation of the thrown object further include instructions to:

identify a free fall start time of the thrown object using a set of accelerometer readings from an accelerometer included with the thrown object;

collect the gyroscope data from a time period immediately prior to the free fall start time; and identify the initial orientation of the thrown object based on angular velocity of the gyroscope data.

20. The at least one non-transitory machine-readable medium of claim 15, wherein the set of magnetometer readings comprises a first reading, a second reading, and a third reading from the magnetometer, the first reading captured at the time, the second reading captured immediately prior to the time, and the third reading captured immediately following the time.

21. The at least one non-transitory machine-readable medium of claim 15, wherein the set of magnetometer readings are obtained via wireless radio link.

* * * * *